US012566549B2

(12) United States Patent
Suh

(10) Patent No.: US 12,566,549 B2
(45) Date of Patent: Mar. 3, 2026

(54) MEMORY SYSTEM WITH PROCESSOR IN MEMORY (PIM)

(71) Applicant: QUALCOMM Incorporated, San Diego, CA (US)

(72) Inventor: Jungwon Suh, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 54 days.

(21) Appl. No.: 18/773,320

(22) Filed: Jul. 15, 2024

(65) Prior Publication Data

US 2026/0016957 A1     Jan. 15, 2026

(51) Int. Cl.
*G06F 3/06* (2006.01)
(52) U.S. Cl.
CPC ............ *G06F 3/061* (2013.01); *G06F 3/0659* (2013.01); *G06F 3/0673* (2013.01)
(58) Field of Classification Search
None
See application file for complete search history.

(56) References Cited

U.S. PATENT DOCUMENTS

2015/0089112 A1    3/2015   Lo et al.
2020/0294558 A1    9/2020   Yu et al.
2020/0294575 A1    9/2020   O et al.
2021/0157516 A1    5/2021   Niu et al.
2021/0389907 A1*  12/2021   Alsop ................. G06F 13/1631
2023/0138048 A1    5/2023   Kwon et al.
2024/0070068 A1    2/2024   Kim et al.
2024/0103745 A1    3/2024   Madan et al.
2024/0103755 A1    3/2024   Jeong et al.

OTHER PUBLICATIONS

International Search Report and Written Opinion PCT/US2025/031382 ISA/EPO Sep. 19, 2025.
Lee S., et al., "Hardware Architecture and Software Stack for PIM Based on Commercial DRAM Technology: Industrial Product", 2021 ACM/IEEE 48th Annual International Symposium on Computer Architecture (ISCA), IEEE, Jun. 14, 2021, pp. 43-56, XP033951897.

* cited by examiner

*Primary Examiner* — Scott C Sun
(74) *Attorney, Agent, or Firm* — Norton Rose Fulbright US LLP

(57) ABSTRACT

A memory system includes a memory interface including a first sub-channel interface associated with a first plurality of memory banks and a first plurality of processor in memory (PIM) blocks and further including a second sub-channel interface associated with a second plurality of memory banks and a second plurality of PIM blocks. During a particular mode of operation associated with the memory system, the first sub-channel interface is configured to communicate, with a host device, one or more memory access commands associated with the first plurality of memory banks. During the particular mode of operation, the second plurality of PIM blocks are configured to perform, concurrently with communication of the one or more memory access commands, one or more PIM operations associated with the second plurality of memory banks. The second sub-channel interface is configured to be disabled during the particular mode of operation.

40 Claims, 13 Drawing Sheets

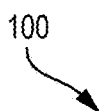

100

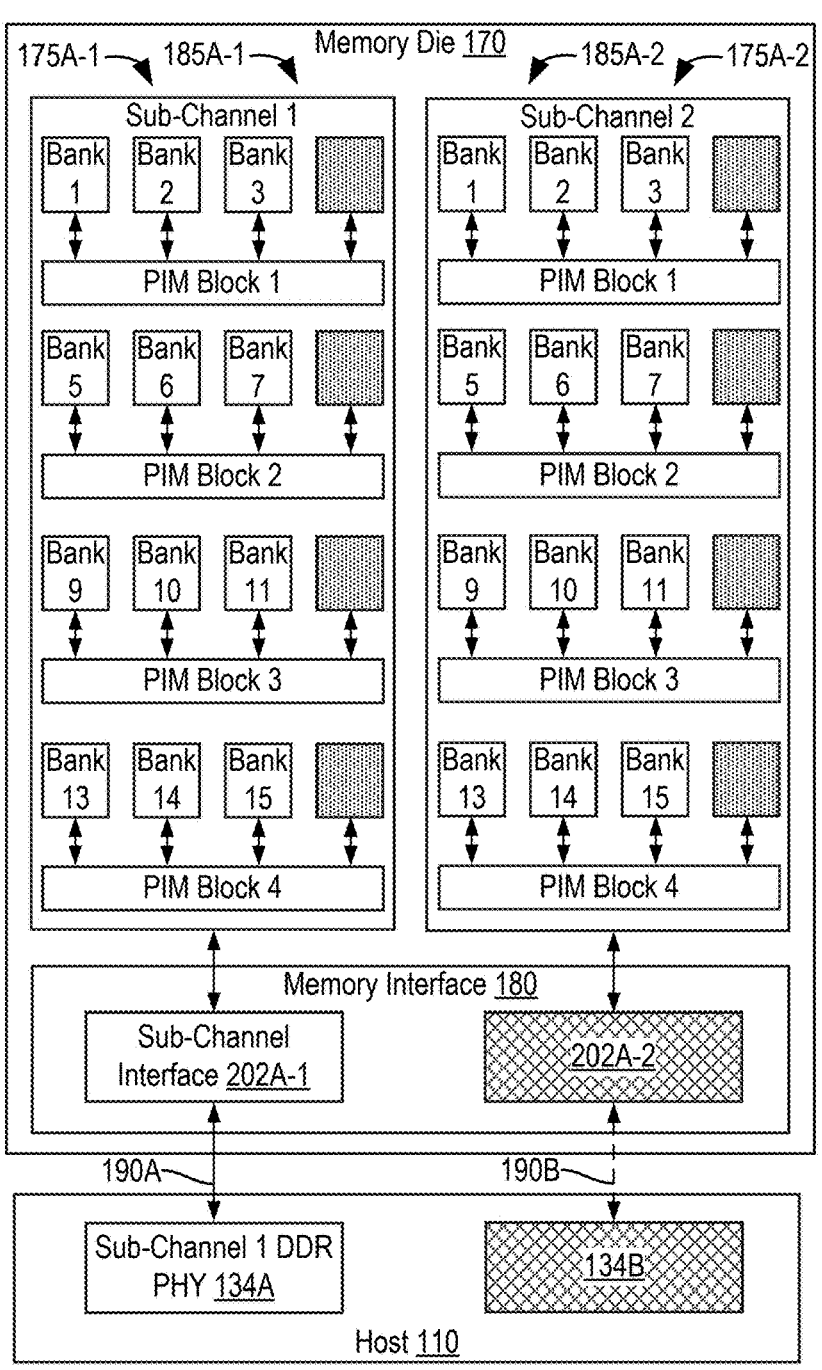

175A-1 ⟶   185A-1 ⟶   Memory Die <u>170</u>   ⟵185A-2   ⟵175A-2

Sub-Channel 1

| Bank 1 | Bank 2 | Bank 3 | |
|---|---|---|---|

PIM Block 1

| Bank 5 | Bank 6 | Bank 7 | |

PIM Block 2

| Bank 9 | Bank 10 | Bank 11 | |

PIM Block 3

| Bank 13 | Bank 14 | Bank 15 | |

PIM Block 4

Sub-Channel 2

| Bank 1 | Bank 2 | Bank 3 | |

PIM Block 1

| Bank 5 | Bank 6 | Bank 7 | |

PIM Block 2

| Bank 9 | Bank 10 | Bank 11 | |

PIM Block 3

| Bank 13 | Bank 14 | Bank 15 | |

PIM Block 4

Memory Interface <u>180</u>

Sub-Channel Interface <u>202A-1</u>

<u>202A-2</u>

190A —

190B —

Sub-Channel 1 DDR PHY <u>134A</u>

<u>134B</u>

Host <u>110</u>

FIGURE 9

Efficiency Mode

for PIM-related Data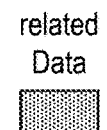

100

Efficiency
Mode

Partitioned
for PIM-
related
Data

1100

1102

Allocate a logical address space for an artificial intelligence (AI) engine

1104

Convert the logical address space to a physical address space that corresponds to a partition reserved for PIM-related data

1106

Store the PIM-related data to the physical address space

Figure 12:
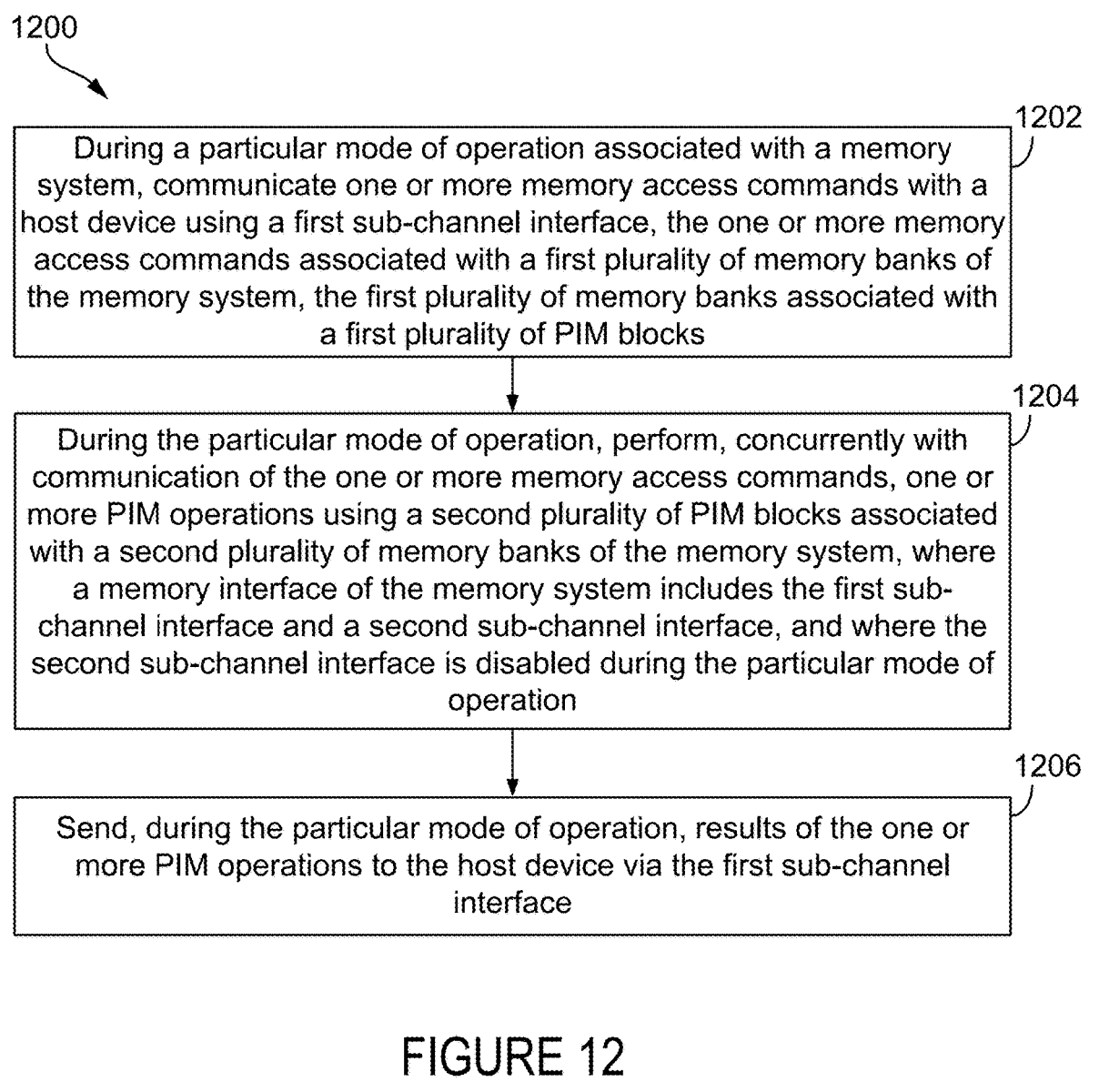

1200

1202

During a particular mode of operation associated with a memory system, communicate one or more memory access commands with a host device using a first sub-channel interface, the one or more memory access commands associated with a first plurality of memory banks of the memory system, the first plurality of memory banks associated with a first plurality of PIM blocks

1204

During the particular mode of operation, perform, concurrently with communication of the one or more memory access commands, one or more PIM operations using a second plurality of PIM blocks associated with a second plurality of memory banks of the memory system, where a memory interface of the memory system includes the first sub-channel interface and a second sub-channel interface, and where the second sub-channel interface is disabled during the particular mode of operation

1206

Send, during the particular mode of operation, results of the one or more PIM operations to the host device via the first sub-channel interface

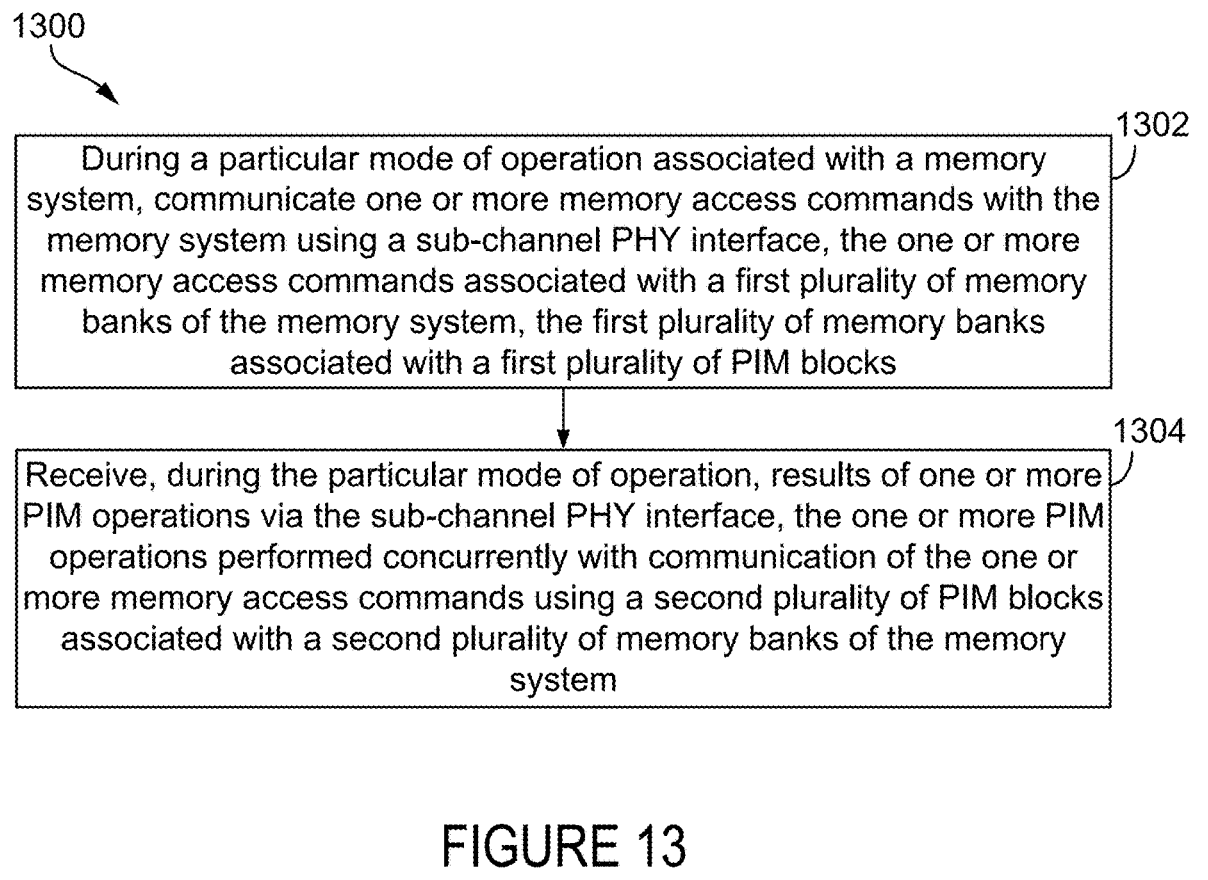

During a particular mode of operation associated with a memory system, communicate one or more memory access commands with the memory system using a sub-channel PHY interface, the one or more memory access commands associated with a first plurality of memory banks of the memory system, the first plurality of memory banks associated with a first plurality of PIM blocks

1304

Receive, during the particular mode of operation, results of one or more PIM operations via the sub-channel PHY interface, the one or more PIM operations performed concurrently with communication of the one or more memory access commands using a second plurality of PIM blocks associated with a second plurality of memory banks of the memory system

FIGURE 13

MEMORY SYSTEM WITH PROCESSOR IN MEMORY (PIM)

TECHNICAL FIELD

Aspects relate generally to computer information systems, and more particularly, to memory systems for storing data in computer information systems.

DESCRIPTION OF THE RELATED TECHNOLOGY

A computing device (such as a laptop, a mobile phone, or another computing device) may include one or more processors to perform various computing operations, such as telephony, wireless data access, camera operations, video operations, and other operations. The computing device may include a memory system to facilitate such computing operations. The one or more processors may be coupled to the memory system and may access the memory system to facilitate such computing operations. For example, the one or more processors may fetch instructions from the memory system to perform the computing functions, may store to the memory system data involved in performing the computing functions, or both.

As the amount of instructions and data stored to memory systems increases, performance may decrease. As an illustrative example, artificial intelligence (AI) applications may be associated with a relatively large amount of memory usage and with particular quality of service (QoS) requirements. As a result, as the amount of instructions and data stored to memory systems increases, the time spent transferring, storing, and retrieving information between a host and a memory system may increase, potentially increasing latency. In addition, transferring, storing, and retrieving information between a host and a memory system consumes power, which may reduce performance of some computing devices, such as battery-operated computing devices and other power-sensitive devices.

SUMMARY

In some aspects, a memory system includes a first plurality of memory banks, a first plurality of processor in memory (PIM) blocks associated with the first plurality of memory banks, a second plurality of memory banks, and a second plurality of PIM blocks associated with the second plurality of memory banks. The memory system further includes a memory interface including a first sub-channel interface associated with the first plurality of memory banks and the first plurality of PIM blocks and further including a second sub-channel interface associated with the second plurality of memory banks and the second plurality of PIM blocks. During a particular mode of operation, the first sub-channel interface is configured to communicate one or more memory access commands with a host device. The one or more memory access commands are associated with the first plurality of memory banks. During the particular mode of operation, the second plurality of PIM blocks are configured to perform, concurrently with communication of the one or more memory access commands, one or more PIM operations associated with the second plurality of memory banks. The second sub-channel interface is configured to be disabled during the particular mode of operation.

In some other aspects, a method of operation of a memory system includes, during a particular mode of operation associated with the memory system, communicating one or more memory access commands with a host device using a first sub-channel interface. The one or more memory access commands are associated with a first plurality of memory banks of the memory system, and the first plurality of memory banks are associated with a first plurality of processor in memory (PIM) blocks. The method further includes, during the particular mode of operation, performing, concurrently with communication of the one or more memory access commands, one or more PIM operations using a second plurality of PIM blocks associated with a second plurality of memory banks of the memory system. A memory interface of the memory system includes the first sub-channel interface and a second sub-channel interface, and the second sub-channel interface is disabled during the particular mode of operation. The method further includes sending, during the particular mode of operation, results of the one or more PIM operations to the host device via the first sub-channel interface.

In some other aspects, an apparatus includes a processing system including one or more processors and one or more memories. The processing system is configured to communicate, during a particular mode of operation associated with a memory system, one or more memory access commands with the memory system using a sub-channel physical (PHY) interface. The one or more memory access commands are associated with a first plurality of memory banks of the memory system, and the first plurality of memory banks are associated with a first plurality of processor in memory (PIM) blocks. The processing system is further configured to receive, during the particular mode of operation, results of one or more PIM operations via the sub-channel PHY interface. The one or more PIM operations are performed concurrently with communication of the one or more memory access commands using a second plurality of PIM blocks associated with a second plurality of memory banks of the memory system.

In some other aspects, a method of operation of a host device includes, during a particular mode of operation associated with a memory system, communicating one or more memory access commands with the memory system using a sub-channel PHY interface. The one or more memory access commands are associated with a first plurality of memory banks of the memory system, and the first plurality of memory banks are associated with a first plurality of processor in memory (PIM) blocks. The method further includes receiving, during the particular mode of operation, results of one or more PIM operations via the sub-channel PHY interface. The one or more PIM operations are performed concurrently with communication of the one or more memory access commands using a second plurality of PIM blocks associated with a second plurality of memory banks of the memory system.

While aspects and implementations are described in this application by illustration to some examples, those skilled in the art will understand that additional implementations and use cases may come about in many different arrangements and scenarios. One or more innovations described herein may be implemented across many differing platform types, devices, systems, shapes, sizes, and packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more innovative aspects described herein. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that one or more innovations described herein may be practiced in a wide variety of devices, chip-level components, systems, distributed arrangements, end-user devices, etc. of varying sizes, shapes, and constitution.

BRIEF DESCRIPTION OF THE DRAWINGS

FIG. 9 illustrates an example of storage partitioning for PIM-related data that may be associated with the system of FIG. 1.

FIG. 12 is a flow chart of an example of a method of operation of a memory system.

FIG. 13 is a flow chart of an example of a method of operation of a host device.

Like reference numbers and designations in the various drawings indicate like elements.

DETAILED DESCRIPTION

Figure 1:
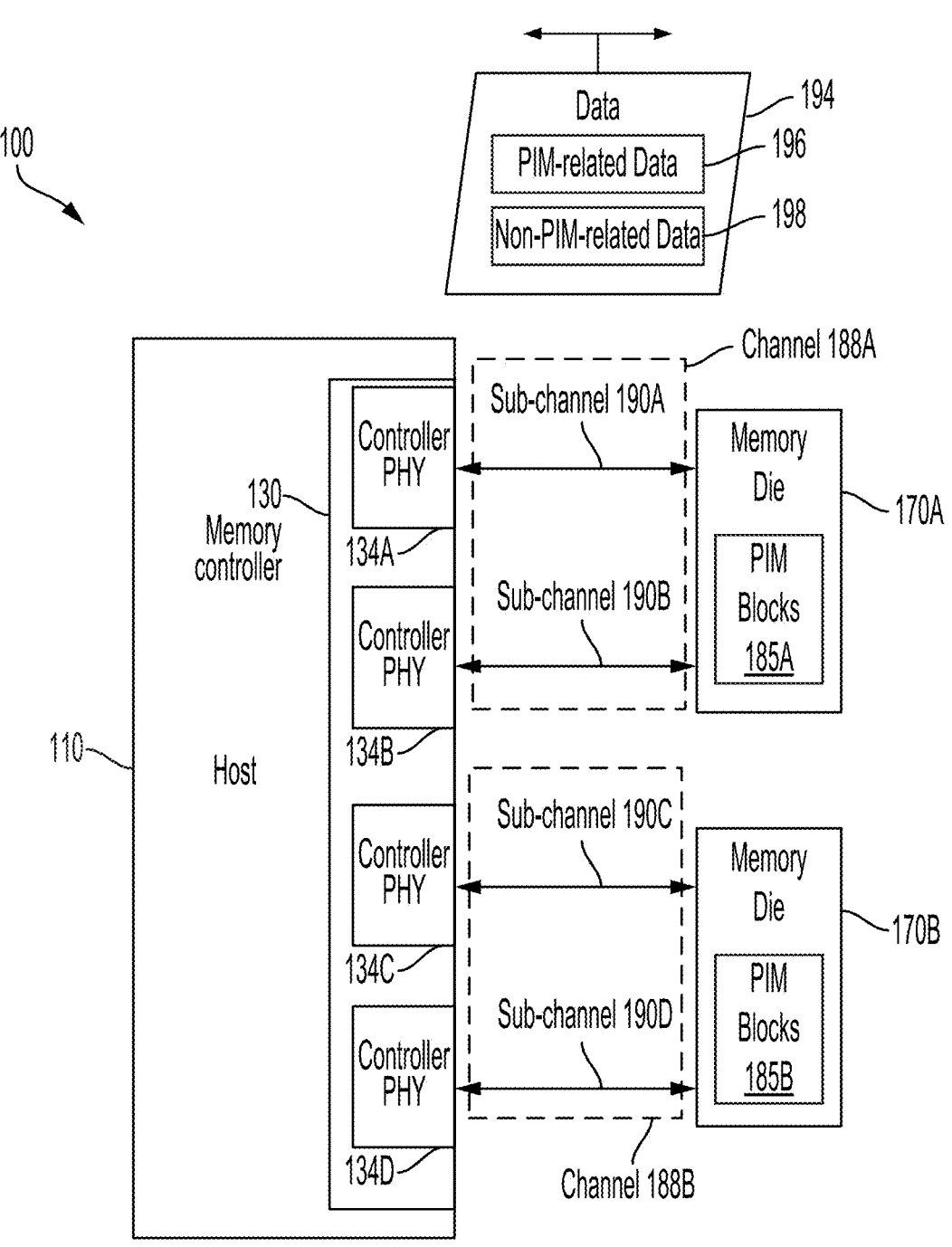
FIG. 1 illustrates an example of a system that includes a host, one or more memory dies, and channels coupling the host and the one or more memory dies.

In some aspects, a memory system may use processor-in-memory (PIM) techniques in connection with an efficiency mode of operation to improve performance. As referred to herein, "PIM" may include or may refer to data processing that is performed by a memory die alternatively or in addition to performing at least some data processing performed by a host device. To illustrate, the memory system may include a host and a memory die that is accessible to the host via a channel. The channel may include a first sub-channel and a second sub-channel, and the memory die may include a first plurality of memory banks associated with the first sub-channel and a second plurality of memory banks associated with the second sub-channel. The first plurality of memory banks may be associated with a first plurality of PIM blocks, and the second plurality of memory banks may be associated with a second plurality of PIM blocks. As referred to herein, a plurality of PIM blocks may be associated with a plurality of memory banks if the plurality of PIM blocks are coupled to and configured to perform PIM processing for the plurality of memory banks.

During the efficiency mode of operation, a sub-channel interface associated with a sub-channel may be deactivated while another sub-channel interface associated with another sub-channel may remain active. For example, a first a sub-channel interface associated with the first sub-channel may remain active while a second sub-channel interface associated with the second sub-channel may be deactivated. Further, in this example, the first sub-channel interface may communicate commands and data associated with both the first plurality of memory banks and the second plurality of memory banks (e.g., so that the host retains access to the second plurality of memory banks while the second sub-channel interface is deactivated). In this case, operations associated with the second plurality of memory banks may be redirected from the second sub-channel interface to the first sub-channel interface. The operations may include, for example, write operations to one or more of the first plurality of memory banks or the second plurality of memory banks, read operations to one or more of the first plurality of memory banks or the second plurality of memory banks, or both.

In some examples, during the efficiency mode of operation, PIM operations may be performed at the second plurality of memory banks (while the second sub-channel interface is deactivated). For example, the PIM operations may include one or more of a PIM load operation, a PIM execute operation, or a PIM store operation.

One or more features described herein may improve performance of a memory system. For example, by selectively performing PIM operations while a sub-channel interface is deactivated, power consumption may be reduced (e.g., by power gating or clock gating the sub-channel interface) while increasing or maintaining throughput or other performance metrics (e.g., by "offloading" processing to a memory die via PIM blocks). Further, such benefits may be achieved while also facilitating access by the host to contents of both the first plurality of memory banks and the second plurality of memory banks. In some examples, interleaving PIM operations for a memory bank with memory access operations (e.g., a read operation or a write operation) for another memory bank may avoid performance degradation associated with some other memory architectures, such as memory architectures in which PIM operations may interfere with other memory traffic. As a result, power consumption may be reduced while increasing or maintaining throughput or other performance metrics, such as quality of service (QoS) performance metrics.

FIG. 1 illustrates an example of a system 100 that may include a host 110, one or more memory dies 170, and channels 188 coupling the host 110 and the one or more memory dies 170. The system 100 may be, for example, a device among computing systems (e.g., servers, datacenters, desktop computers), mobile computing device (e.g., laptops, cell phones, vehicles, etc.), Internet of Things (IoT) devices, virtual reality (VR) systems, augmented reality (AR) systems, automobile systems (e.g., driver assistance systems, autonomous driving systems), image capture devices (e.g., stand-alone digital cameras or digital video camcorders, camera-equipped wireless communication device handsets, such as mobile telephones, cellular or satellite radio telephones, personal digital assistants (PDAs), panels or tablets, gaming devices, computing devices such as webcams, video surveillance cameras, or other devices with digital imaging or video capabilities), and/or multimedia systems (e.g., televisions, disc players, streaming devices,).

The host 110 may include at least one processor (not shown in FIG. 1), and the at least one processor may include one or more cores such as a central processing unit (CPU), a graphic processing unit (GPU), a digital signal processor (DSP), a multimedia engine, and/or a neural processing unit (NPU). The host 110 may be configured to couple to and to communicate with the memory dies 170A-B via the channels 188A-B to perform computing functions, such as one or more of data processing, data communication, graphic display, camera, AR or VR rendering, image processing, neural processing, etc. For example, the memory dies 170A to 170B may store instructions or data for the host 110 to perform computing functions.

The host 110 may include a memory controller 130, which may include controller physical (PHY) modules 134A-D. Each of the controller PHY modules 134A-D may be coupled to a respective one of the memory dies 170A-B via respective channels 188A-188B. Each of the channels 188A-B may include multiple sub-channels, such as sub-channels 190A-B for channel 188A and sub-channels 190C-D for channel 188B. For ease of reference, read and write operations may be referenced from a perspective of the host 110 or from another perspective. For example, in a read operation, the host 110 may receive data stored from one or more of the memory dies 170A-B via one or more of the channels 188A-B. In a write operation, the host 110 may provide data to be written into one or more of the memory dies 170A-B for storage via one or more of the channels 188A-B. The memory controller 130 may be configured to control various aspects of communications to and from the memory dies 170A-B. The controller PHY modules 134A-D may be configured to control electrical characteristics (e.g., voltage levels, phase, delays, frequencies, etc.) of signals provided or received on the channels 188A-B, respectively, to perform read or write or other memory operations.

In some examples, the memory dies 170A-B may include Low Power Double Data Rate Dynamic Random Access Memory (LPDDR DRAM) (e.g., LPDDR5 or LPDDR6). In some examples, the memory dies 170A-B may be different kinds of memory, such as one LPDDR5, one LPDDR6, one Flash memory, and one SRAM, respectively. The host 110, the memory dies 170A-B, and/or the channels 188A-B may operate according to an LPDDR (e.g., LPDDR5, LPDDR6) interface specification. In some examples, each of the channels 188A-B may have a data bitwidth of 16 bits (e.g., 16 DQs). In some examples, each of the channels 188A-B may have a data bitwidth of 24 bits (e.g., 24 DQs). In FIG. 1, two channels are shown, however the system 100 may include more channels or fewer channels, such as 8 or 16 channels. Further, in some implementations, signal lines (e.g., DQs) may be shared between sub-channels or each sub-channel may have its own dedicated bits for signal lines.

The channels 188A-B may each include multiple sub-channels providing parallel access to the memory dies 170A-B, respectively. The sub-channels may be controlled to dynamically adjust bandwidth to each of the memory dies 170A-B. Additional details of one or more examples associated with providing access to a memory system (such as one of memory dies 170A-B including logic and control circuit) are described with reference to FIG. 2. For example, the channels 188A-B may include individually controllable sub-channels 190A-D. Multiple sub-channels may be used to provide high-performance, high-bandwidth communication to a memory module. Some of the sub-channels may be disabled to reduce power consumption with a corresponding decrease in bandwidth. When sub-channels are disabled, the host 110 may retain access to the full range of address in the memory module, although the bandwidth for transferring data is reduced by the number of sub-channels that are disabled.

One or more memory dies described herein may include a processor in memory (PIM) device. To illustrate, the memory die 170A may include PIM blocks 185A. Alternatively, or in addition, the memory die 170B may include PIM blocks 185B. In some implementations, the host 110 may "offload" one or more operations to any of the PIM blocks 185A-B. In some examples, the one or more operations may include processing associated with one or more artificial intelligence (AI) applications executed by the host 110, as described further below. In some implementations, a PIM block 185 may include, for example, one or more processing cores or other logic circuitry that executes instructions. To further illustrate, a PIM block 185 may include, for example, one or more CPU cores, one or more GPU processing cores, one or more DSP cores, other logic circuitry, or a combination thereof. In some examples, a PIM block 185 may be referred to as a PIM device or as a PIM processor.

In addition, the host 110 and a memory die 170 may store and process data, such as data 194. In some examples, the data 194 may include data processed (at least in part) using one or more PIM blocks 185. Such data may include PIM-related data 196. As referred to herein, PIM-related data may include data that is processed by, or to be processed by, any of the PIM blocks 185. Further, the data 194 may include other data, such as data that may not be processed using one or more PIM blocks 185. Such data may be referred to as non-PIM-related data and may include non-PIM-related data 198.

Figure 2:
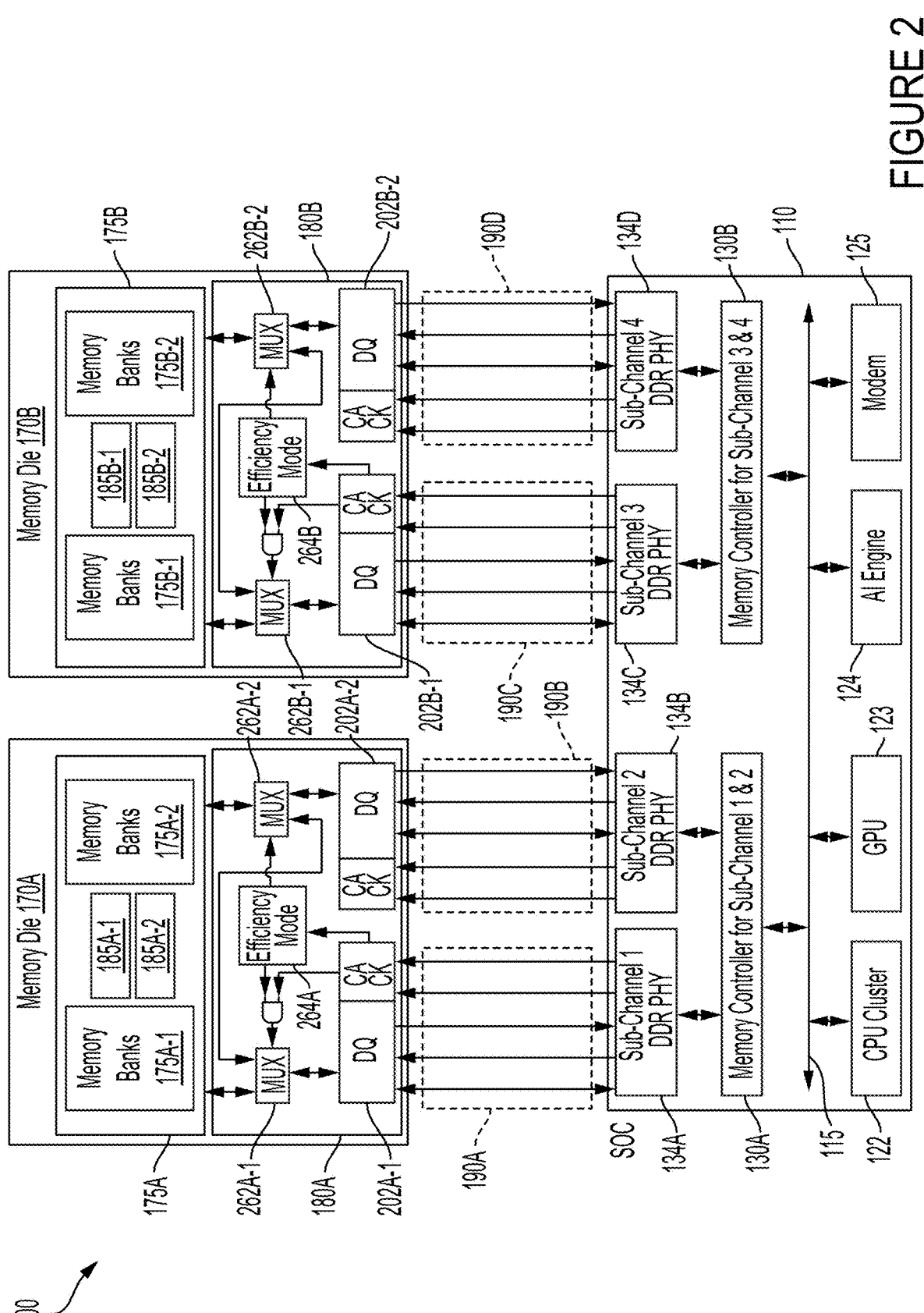
FIG. 2 illustrates an example of a configuration that may be associated with the system of FIG. 1.

FIG. 2 illustrates an example of a configuration that may be associated with the system 100 of FIG. 1. The system 100 may include the host 110, the memory dies 170A-B, and the sub-channels 190A-190D. The sub-channels 190A-190D between host 110 and the memory dies 170A-B may include a plurality of connections, some of which may carry data (e.g., user data or application data) and some of which may carry non-data (e.g., control information, such as addresses and/or other signaling information). For example, non-data connections in sub-channel 190A may include a data clock (e.g., WCK) used in communicating data with the respective memory die 170 and a read data strobe (e.g., RDQS) used in receiving data from the respective memory die 170. The sub-channel 190A may further include a data mask (e.g., DM, sometimes referred to as data mask inversion DMI) used to mask a certain part of data in a write operation. The sub-channel 190A may further include command and address (e.g., CA[0:n]) and an associated command clock (CK) to provide commands (e.g., read or write commands) to the memory die 170A. In some examples, one or more of the sub-channels 190B-190D may be configured as described with reference to the sub-channel 190A.

The host 110 may include at least one processor, such as one or more of a CPU cluster 122 (e.g., one or more CPU cores including execution logic and/or caches), a graphics processing unit (GPU) 123, an artificial intelligence (AI) engine 124, or a modem 125. The host 110 may further include memory controllers 130A-130B. Each of the controllers 130A-130B may be coupled to multiple PHY interfaces (e.g., PHY interfaces 134A-B for memory controller 130A) coupled to one or more memory dies 170 through a sub-channel. In some aspects, the PHY interfaces 134 may be DDR PHY interfaces. In the example shown in FIG. 2, each of the memory controllers 130A-B may be coupled to two sub-channels in the channel (e.g., where memory controller 130A is coupled to PHY interfaces 134A and 134B and memory controller 130B is coupled to PHY interfaces 134C and 134D). In some other examples, the memory controllers 130A and 130B may be configured with N and M sub-channels, respectively, in which N may be equal to M or N may be different from M, where N and M are integer numbers greater than one. In some examples, N and M may be powers of two.

The memory controllers 130A-130B may couple to the at least one processor via a bus 115 for communicating information while performing various computing functions. A bus 115 may encompass multiple physical connections as well as intervening stages such as buffers, latches, registers, etc. In some examples, the bus 115 may include an interconnect, such as an SoC interconnect fabric or another type of interconnect. The memory controllers 130A-130B may be part of a memory interconnect between the at least one processor and the memory dies 170A-B.

The memory dies 170A-B may include memory interfaces 180A-180B, respectively, each configured to provide or to receive signals on connections of the sub-channels 190A-190D. Memory interfaces 180A-180B may be configured to capture (e.g., to sample) data, commands, and addresses from the host 110 via the sub-channels 190A-190D and to output data to the host 110 via the sub-channels 190A-190D. Memory interfaces 180A-180B may include buffers (or other short-term memory) and/or logic circuitry for decoding and executing commands received from the memory controllers 130A-130B of the host 110.

Memory interfaces 180 may include data processing circuitry DQ corresponding to each sub-channel 190 for decoding and/or encoding data on bus lines corresponding to Data Bus [0:k−1], Write Data Clock (WCK), and Read Data Clock (RDQ). Memory interfaces 180 may also include command processing circuitry CA/CK corresponding to each sub-channel 190 for decoding and/or encoding data on bus lines corresponding to CA Bus [0:m−1] and command clock (CK). The integers m and k may correspond to respective bitwidths of the command bus and data bus, respectively. In an example of a two sub-channel configuration such as shown in FIG. 2, the DQ blocks in a memory die 170 may provide data to multiplexers (e.g., multiplexer 262A-1 and 262A-2) and the CA/CK blocks in a die 170 may provide data to multiplexers (e.g., 262A-1 and 262A-2) as a control signal.

For example, memory interface 180A of memory die 170A may receive signals through sub-channels 190A and 190B from memory controller 130A. Memory interface 180B of memory die 170B may receive signals through sub-channels 190C and 190D from memory controller 130B. In some implementations, the sub-channels 190A and 190B may include duplicative sets of signals such that the memory interface 180A may communicate with memory die 170A if either of the sub-channels 190A or 190B is disabled. When both sub-channels 190A and 190B are enabled, the memory controller 130 may communicate with the memory interface 180A through sub-channel 190A and sub-channel 190B. For example, the memory controller 130A may issue separate commands through the sub-channel 190A and the sub-channel 190B to access memory cells in parallel to achieve higher bandwidth than when operating on one sub-channel.

The memory dies 170A-B may include memory cells (e.g., DRAM memory cells, MRAM memory cells, SRAM memory cells, flash memory cells, or other memory cells) that store values, such as values corresponding to user or application data. The memory cells of memory dies 170A-B may be organized into a plurality of memory banks, and the memory banks may be grouped for access through the sub-channels 190A-190D. For example, the memory die 170A may include a first plurality of memory banks 175A-1 accessible through the sub-channel 190A and a second plurality of memory banks 175A-2 accessible through the sub-channel 190B. As another example, the memory die 170B may include a third plurality of memory banks 175B-1 accessible through the sub-channel 190C and a fourth plurality of memory banks 175B-2 accessible through the sub-channel 190D. Each memory bank may be further divided and organized as a plurality of pages.

Although the memory cells of the memory dies 170A-B may be organized as pluralities of memory banks associated with corresponding sub-channels, the different pluralities of memory banks may be accessed through another of the sub-channels. Some memory banks may be accessible through other sub-channels when a memory die 170 is operating in an efficiency mode with some sub-channels disabled as described in further detail below. For example, if sub-channel 190B is disabled, the second plurality of memory banks 175A-2 may be accessed through the sub-channel 190A otherwise associated with the first plurality of memory banks 175A-1.

In some aspects of the disclosure, a memory die 170 may include logic circuitry to enable access to a memory bank of the memory die 170 when a sub-channel interface associated with the memory bank is disabled during operation based on the efficiency mode. Some illustrative examples of such logic circuitry are illustrated in FIG. 2 and may include, for example, multiplexers 262 and mode registers 264. Alternatively, or in addition, access to at least some memory banks through alternative sub-channels may be enabled using one or more wire bonds, one or more fuses, one or more read-only memories (ROMs) (e.g., a ROM installed during memory package assembly), programming of the mode registers 264 using a mode register write operation by the host 110 (e.g., at power-up of the host 110 or at another time), or a combination thereof.

To further illustrate, the multiplexers 262 may be controlled, for example, through mode registers 264A-264B to change the data flow in a memory die 170. Each sub-channel 190 for a specific memory controller 130 may correspond to a respective multiplexer 262 of the memory interface 180 corresponding to the specific memory controller. Thus, each of the plurality of memory banks 175A-B may be coupled to a respective multiplexer 262. The multiplexers are coupled to each other to permit accessing all of the pluralities of memory banks 175A-B which correspond to the sub-channels 190 for the specific memory controller.

The multiplexers 262 may be configured to provide access to a particular plurality of memory banks (e.g., to route data and/or signals from a specific sub-channel to the particular plurality of memory banks) via a control element of the memory interface 180, such as mode registers 264. For example, communications with the second plurality of memory banks 175A-2 through the sub-channel 190A and the sub-channel 190B may be provided by first multiplexer 262A-1 and second multiplexer 262A-2. The first multiplexer 262A-1 receives signals from the sub-channel 190A and applies them to the first plurality of memory banks 175A-1 or the second multiplexer 262A-2. To this end, the first multiplexer 262A-1 also couples to the second multiplexer 262A-2. Whether the first multiplexer 262A-1 passes the received signals to the first plurality of memory banks 175A-1 or the second multiplexer 262A-2 may be controlled by circuitry, such as the depicted command and address (CA) bus, of the memory interface 180A. In the illustrative example of FIG. 2, a control signal (e.g., based on control information such as the SC operand described further below) from the CA bus is passed through an AND gate together with a signal from the mode register 264A to a control input of the multiplexer 262A-1. Different implementations, e.g., using alternative logic circuitry, are possible, e.g., depending on the content of the mode register.

When a mode register 264A is set for a first operating mode (such as a performance mode), the first multiplexer 262A-1 does not pass signals from sub-channel 190A to the second multiplexer 262A-2. When the mode register 264A is set for a second operating mode (e.g., an efficiency mode in which sub-channel 190B is disabled), the first multiplexer 262A-1 passes signals from sub-channel 190A to the second plurality of memory banks 175A-2 through the second multiplexer 262A-2. The second multiplexer 262A-2 is similarly configured by the mode register 264A to configure whether the data for the second plurality of memory banks 175A-2 is received through one or the other of the two DQ blocks. When the mode register 264A is set for the first operating mode, the second multiplexer 262A-2 passes signals from sub-channel 190B to the second plurality of memory banks 175A-2. In this first operating mode, sub-channels 190A and 190B may thus be used independently and in parallel to access the first plurality of memory banks 175A-1 and the second plurality of memory banks 175A-2, respectively. When the mode register 264A is set for the second operating mode, the second multiplexer 262A-2 may pass signals from the first multiplexer 262A-1 to the second plurality of memory banks 175A-2.

The mode register 264A-264B may control the multiplexers based on certain commands provided to a memory die 170. For example, some commands (such as bank active, write, read, precharge, or refresh) from a host to a memory device may include an indication of a sub-channel memory bank (e.g., indicating the plurality of memory banks 175A-1 or 175A-2). When these commands are received, multiplexer 262A-1 and 262A-2 are controlled by the mode register 264A and an output of a command decoder processing such a command that indicates a sub-channel memory bank. In one implementation, using the memory die 170A as an example, the output of the command decoder CA/CK block may be combined, such as through an AND gate, with an output of the mode register 264A to determine a control input to the multiplexer 262A-1.

Data may be processed by the at least one processor of the host 110, resulting in the at least one processor instructing the memory controllers 130A-130B to store and/or retrieve data from the memory dies 170A-B. For example, data may be generated during the execution of an application, such as a spreadsheet program that computes values based on other data. As another example, data may be generated during the execution of an application by receiving user input to, for example, a spreadsheet program. As a further example, data may be generated during the execution of a gaming application, which generates information regarding a representation of a scene rendered by a three-dimensional (3-D) application.

The sub-channels 190A-190D carry signaling between the host 110 and the memory dies 170A-B and may be implemented in accordance with the JEDEC DRAM specification (e.g., LPDDR5, LPDDR6). In some examples, the sub-channels 190A-190D may be coupled to sub-channel interfaces 202. For example, the sub-channels 190A-190D may be coupled to a first sub-channel interface 202A-1, a second sub-channel interface 202A-2, a third sub-channel interface 202B-1, and a fourth sub-channel interface 202B-2, respectively. Each of the sub-channel interfaces 202 may include a data interface (DQ) to receive data from the host 110, a command and address (CA) interface to receive control information (such as an address and an opcode) from the host 110, and a command and address clock (CK) interface.

To further illustrate, in the example of FIG. 2, each sub-channel interface 202 may be configured to operate in accordance with signal connections of data (DQ[0:k−1] for a buswidth of k with k>1), a read data strobe (RDQS), a data mask (DM), a data clock (WCK), command and address (CA[0:n] for an address length of n), and command and address clock (CK). The host 110 may use the read data strobe RDQS to strobe (e.g., to clock) data in a read operation to receive the data on the data pins (DQs). The memory dies 170A-B may use the data mask DM to mask certain parts of the data from being written in a write operation. The memory dies 170A-B may use the data clock WCK to sample data on the DQs for a write operation. The memory dies 170A-B may use the command and address clock CK to clock (e.g., to receive) the CAs. A signal connection for each of the signals may include a pin at the host 110, a pin at a memory die, and one or more conductive traces electrically connecting the pins. In some implementations, one or more conductive traces may be part of a single integrated circuit (IC) containing the at least one processor and the memory dies 170A-B as a system on chip (SoC) using a package on package (PoP) construction.

Further, as illustrated in the example of FIG. 2, the memory die 170A may include a first plurality of PIM blocks 185A-1 associated with the first plurality of memory banks 175A-1 and may further include a second plurality of PIM blocks 185A-2 associated with the second plurality of memory banks 175A-2. Each PIM block of the first plurality of PIM blocks 185A-1 may be coupled to a respective memory bank of the first plurality of memory banks 175A-1, and each PIM block of the second plurality of PIM blocks 185A-2 may be coupled to a respective memory bank of the second plurality of memory banks 175A-2.

Alternatively, or in addition, the memory die 170B may include a first plurality of PIM blocks 185B-1 associated with the third plurality of memory banks 175B-1 and may further include a second plurality of PIM blocks 185B-2 associated with the fourth plurality of memory banks 175B-2. Each PIM block of the first plurality of PIM blocks 185B-1 may be coupled to a respective memory bank of the third plurality of memory banks 175B-1, and each PIM block of the second plurality of PIM blocks 185B-2 may be coupled to a respective memory bank of the fourth plurality of memory banks 175B-2.

Figure 3:
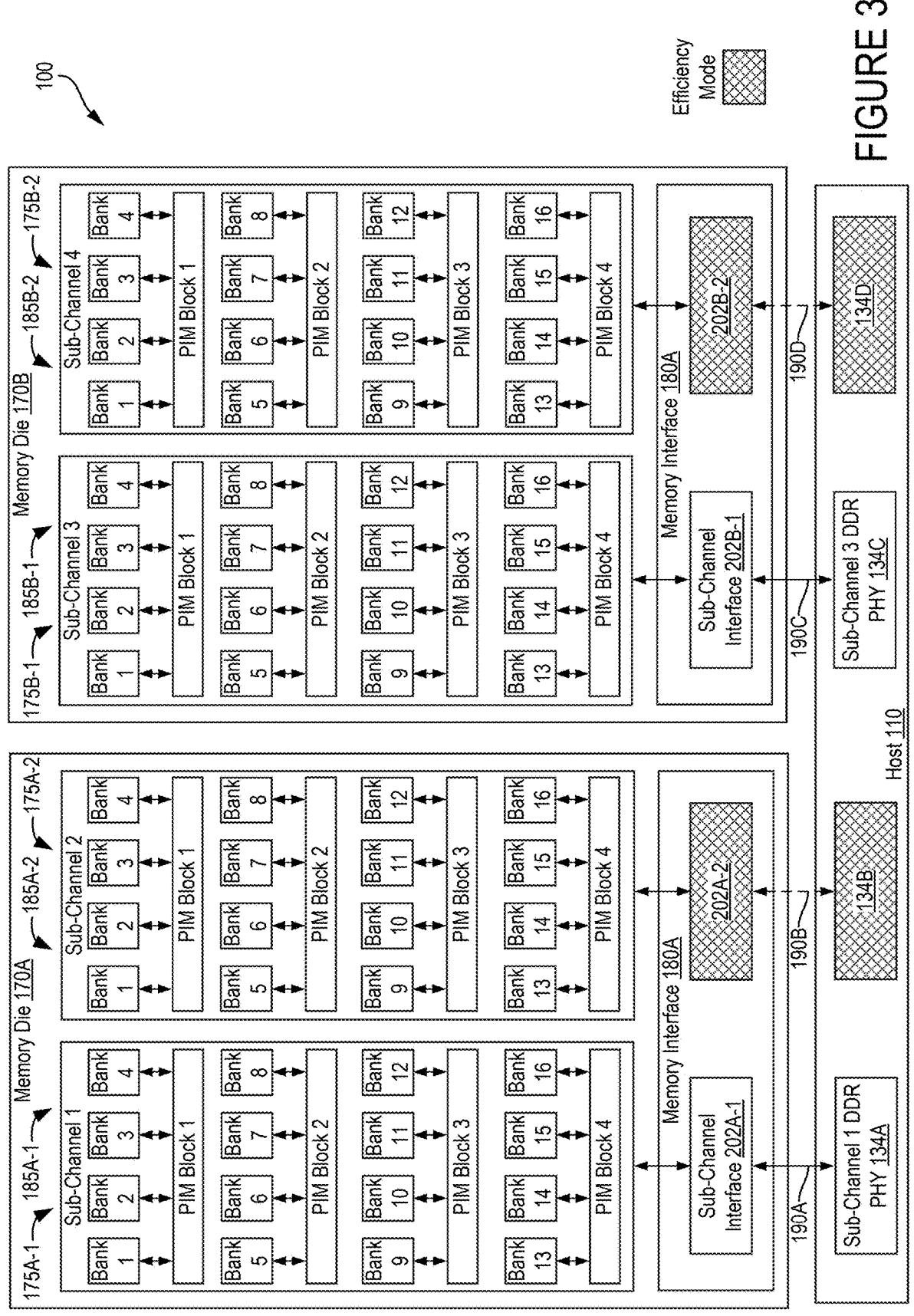
FIG. 3 illustrates an example of a mode of operation that may be associated with the system of FIG. 1.

FIG. 3 illustrates an example of a particular mode of operation that may be associated with the system 100. In the example of FIG. 3, the system 100 may include the host 110 and one or more memory dies, such as the memory dies 170A-B. Further, each of the memory dies 170A-B may be associated with multiple sub-channels. For example, the memory die 170A may be associated with a first sub-channel ("sub-channel 1") and a second sub-channel ("sub-channel 2"). As another example, the memory die 170B may be associated with a third sub-channel ("sub-channel 3") and a fourth sub-channel ("sub-channel 4").

Each such sub-channel may be associated with a plurality of memory banks. For example, each sub-channel may be associated with memory banks 1, 2, 3, 4, 5, 6, 7, 8, 9, 10, 11, 12, 13, 14, 15, and 16. In some examples, the memory banks associated with sub-channel 1, sub-channel 2, sub-channel 3, and sub-channel 4 may include the first plurality of memory banks 175A-1, the second plurality of memory banks 175A-2, the third plurality of memory banks 175B-1, and the fourth plurality of memory banks 175B-2, respectively.

Each such sub-channel may also be associated with a plurality of PIM blocks. For example, each sub-channel may be associated with PIM blocks 1, 2, 3, and 4. Further, the PIM blocks illustrated in FIG. 3 may be included in the PIM blocks 185. To illustrate, the PIM blocks 185A-1, 185A-2, 185B-1, and 185B-2 may include the PIM blocks of sub-channel 1, sub-channel 2, sub-channel 3, and sub-channel 4, respectively. In the example of FIG. 3, some features (such as features of the host 110 and the sub-channel interfaces 202) may be omitted for clarity. Although some examples herein may illustrate four memory banks per one PIM block, other examples are also within the scope of the disclosure. To illustrate, in some other implementations, a memory die 170 may include eight memory banks per PIM block, two memory banks per PIM block, one memory bank per PIM block, or another configuration.

In some examples, memory banks of FIG. 3 may be grouped into rows, and each row of memory banks may be associated with a respective PIM block. For example, in each sub-channel, a first row may include memory banks 1, 2, 3, and 4, and the first row may be associated with PIM block 1. As another example, a second row may include memory banks 5, 6, 7, and 8, and the second row may be associated with PIM block 2. As additional examples, a third row may include memory banks 9, 10, 11, and 12, and a fourth row may include memory banks 13, 14, 15, and 16. The third row may be associated with PIM block 3, and the fourth row may be associated with PIM block 4.

FIG. 3 also illustrates an example of a particular mode of operation that may be associated with the system 100. In some examples, the particular mode may correspond to an efficiency mode, which may also be referred to as a "static" efficiency mode. During operation according to the particular mode, at least one sub-channel interface 202 may be inaccessible to the host 110, while at least one other memory channel interface 202 may be accessible to the host 110.

To illustrate, during the particular mode of operation, the first sub-channel interface 202A-1 may be accessible to the host 110, and the second sub-channel interface 202A-2 may be inaccessible to the host 110. As another example, during the particular mode of operation, the third sub-channel interface 202B-1 may be accessible to the host 110, and the fourth sub-channel interface 202B-2 may be inaccessible to the host 110. In the example of FIG. 3, both the sub-channel interfaces 202A-2 and 202B-2 are inaccessible to the host 110. In other examples, only one of the sub-channel interfaces 202A-2 and 202B-2 are inaccessible to the host 110, or one or more other sub-channel interfaces may be inaccessible to the host 110.

To further illustrate, during the particular mode of operation, the first sub-channel interface 202A-1 may be configured to couple the host 110 to the first plurality of memory banks 175A-1 and to the second plurality of memory banks 175A-2. For example, the first sub-channel interface 202A-1 may use the multiplexers 262A-1 and 262A-2 (not shown in FIG. 3) to access the first plurality of memory banks 175A-1, the second plurality of memory banks 175A-2, or both.

Figure 4:
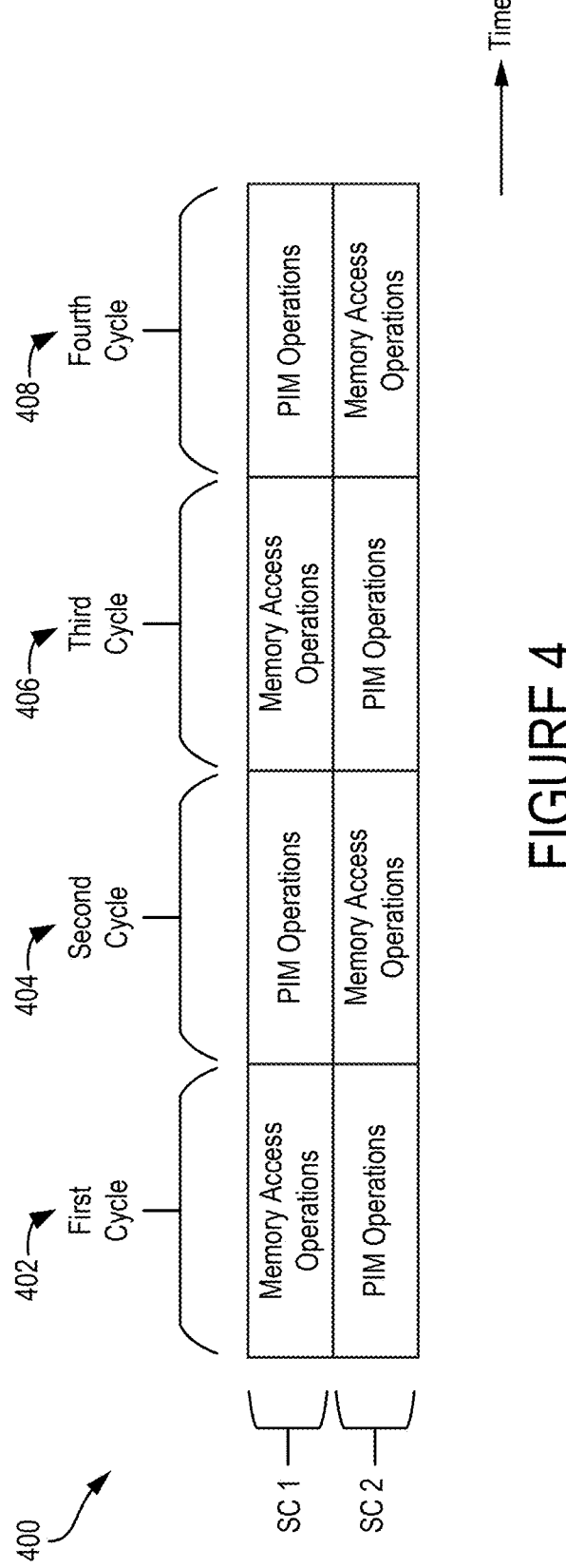
FIG. 4 illustrates an example of a sub-channel interleaving scheme.

FIG. 4 illustrates an example of a sub-channel interleaving scheme 400. In some examples, the system 100 may operate in accordance with the sub-channel interleaving scheme 400. For example, in some implementations, the sub-channel interleaving scheme 400 may be activated (and deactivated) by the host 110. In the sub-channel interleaving scheme 400, operations of one type (e.g., memory access operations) may be interleaved with operations of another type (e.g., PIM operations) for different sub-channels, such as a first sub-channel and a second sub-channel. In some examples, the first sub-channel and the second sub-channel may correspond to sub-channels 190A and 190B, respectively. Further, the system 100 may operate based on the particular mode of operation described with reference to FIG. 3 (e.g., an efficiency mode) in connection with the sub-channel interleaving scheme 400 of FIG. 4.

During a first cycle 402 and during a third cycle 406 of the sub-channel interleaving scheme 400, one or more memory banks of the first plurality of memory banks 175A-1 may perform memory access operations, and the PIM blocks 185A-2 may perform PIM operations for one or more memory banks of the second plurality of memory banks 175A-2. To illustrate, the memory access operations may include one or more of a bank active operation, a pre-charge operation, a refresh operation, a write operation, or a read operation performed at one or more memory banks of the first plurality of memory banks 175A-1. In some examples, the PIM operations may include one or more of a PIM load operation, a PIM store operation, or a PIM execution operation performed by one or more of the PIM blocks 185A-2.

During a second cycle 404 and during a fourth cycle 408 of the sub-channel interleaving scheme 400, one or more memory banks of the second plurality of memory banks 175A-2 may perform memory access operations, and the PIM blocks 185A-1 may perform PIM operations for one or more memory banks of the first plurality of memory banks 175A-1. To illustrate, the memory access operations may include one or more of a bank active operation, a pre-charge operation, a refresh operation, a write operation, or a read operation performed at one or more memory banks of the second plurality of memory banks 175A-2. In some examples, the PIM operations may include one or more of a PIM load operation, a PIM store operation, or a PIM execution operation performed by one or more of the PIM blocks 185A-1.

Figure 5:
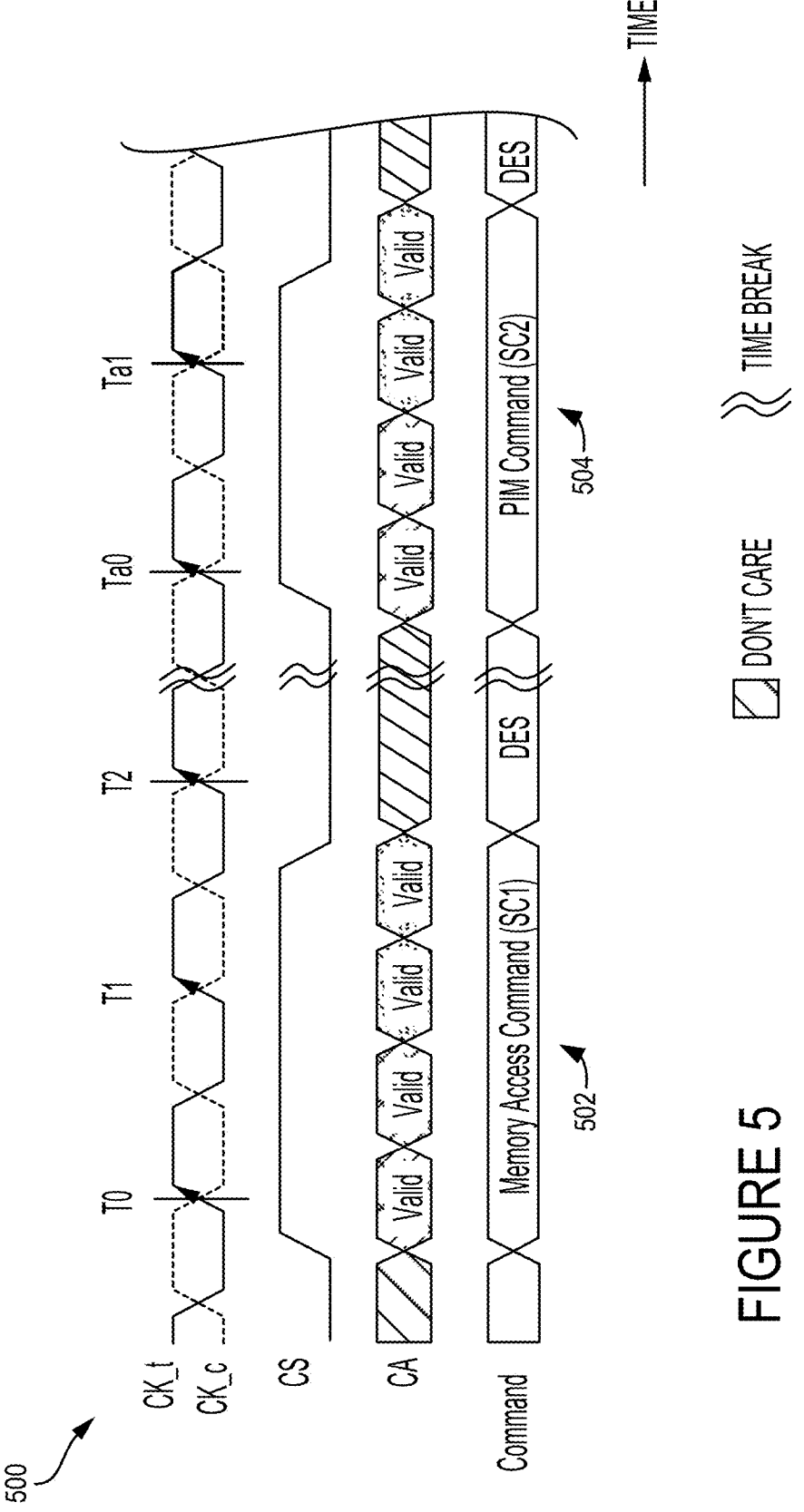
FIG. 5 illustrates example signaling for transfer of data and commands during a cycle of the sub-channel interleaving scheme of FIG. 4.

FIG. 5 illustrates example signaling 500 for transfer of data and commands during a cycle (e.g., the first cycle 402) of the sub-channel interleaving scheme 400 of FIG. 4. The signaling 500 may include a command and address clock signal (CK), which may be a differential signal having CK_t and CK_c signal connections. The signaling 500 may further include a chip select signal (CS), which may be used to select among memory dies of the memory dies 170A-B. The signaling 500 may further include a command and address signal (CA) and commands, such as a memory access command 502 associated with a first sub-channel (SC1) and a PIM command 504 associated with a second sub-channel (SC2). In some examples, the first sub-channel and the second sub-channel may correspond to sub-channels 190A and 190B, respectively.

In some examples, memory access operations may be interleaved with respect to PIM operations within a cycle (e.g., the first cycle 402) of the sub-channel interleaving scheme 400 of FIG. 4. To illustrate, during the first cycle

402, the first sub-channel interface 202A-1 may receive one or more memory access commands (such as the memory access command 502) from the host 110 and may receive one or more PIM commands (such as the PIM command 504) the host 110. In some examples, the memory access command 502 may indicate a read operation or a write operation. In some examples, the PIM command 504 may indicate a PIM load operation, a PIM execute operation, or a PIM store operation. To further illustrate, Table 1 illustrates timing of operations that may be implemented using the signaling 500 of FIG. 5. In some examples, the example of Table 1 may correspond to a particular cycle of the sub-channel interleaving scheme 400 of FIG. 4. In the example of Table 1, the signaling 500 may be performed during time intervals T (T0 to T2) and T1 (Ta0 to Ta2), which may be included in the time intervals depicted in FIG. 5. Further, the signaling 500 may be performed during time intervals Tb (Tb0 to Tb2), Tc (Tc0 to Tc2), Td (Td0 to Td2), Te (Te0 to Te2), and Tf (Tf0 to Tf2). In some examples, the time intervals Tb, Tc, Td, Te, and Tf may follow the time intervals T and Ta of FIG. 5.

TABLE 1

| Time Interval | Command for SC1 | Command for SC2 |
|---|---|---|
| T0 to T2 | Read Command | |
| Ta0 to Ta2 | | PIM Load Command |
| Tb0 to Tb2 | Read Command | |
| Tc0 to Tc2 | | PIM Execute Command |
| Td0 to Td2 | Read Command | |
| Te0 to Te2 | | PIM Store Command |
| Tf0 to Tf2 | Read Command | |

Figure 6:
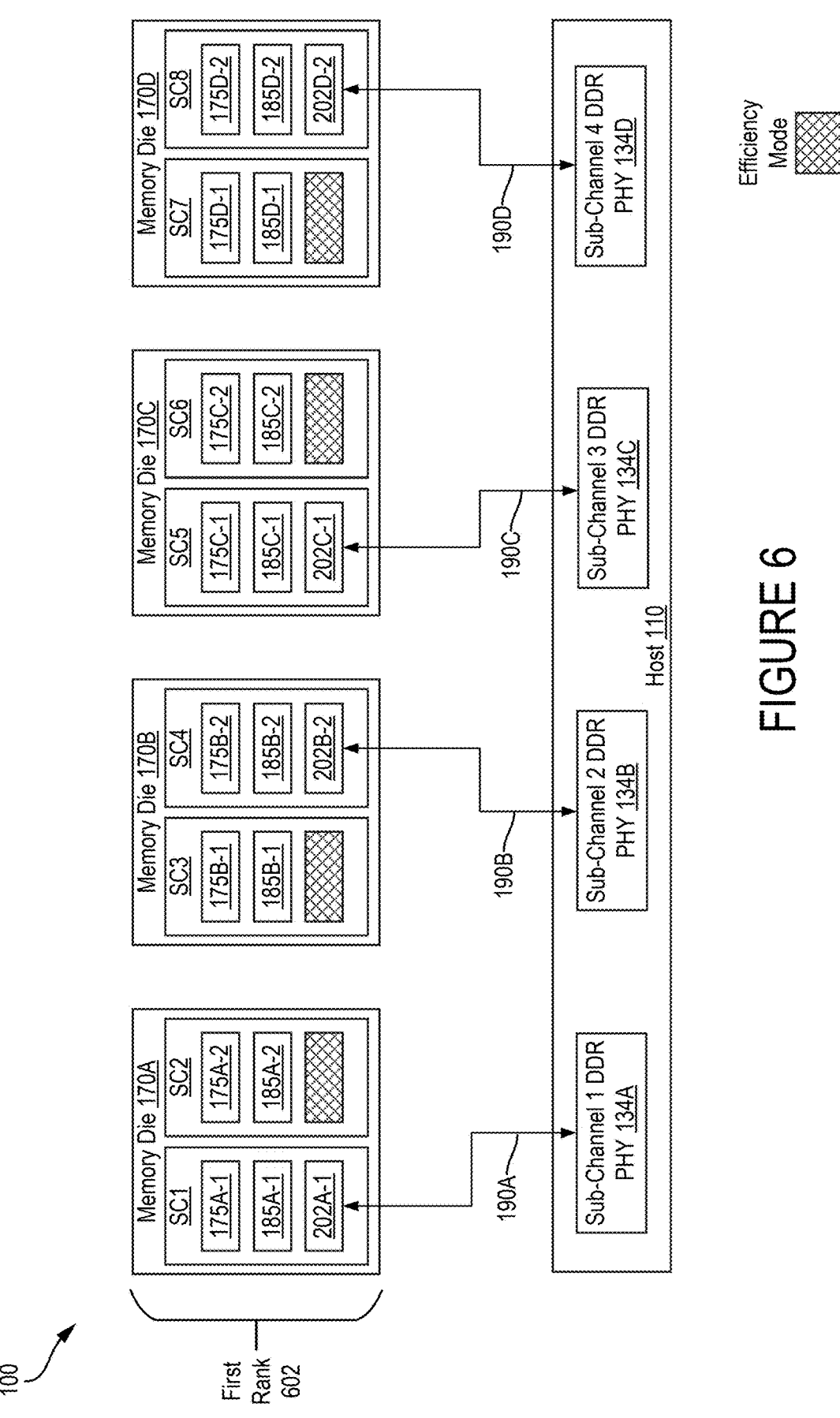
FIG. 6 illustrates an example of a single-rank configuration that may be associated with the system of FIG. 1.

FIG. 6 illustrates an example of a single-rank configuration that may be associated with the system 100. In the example of FIG. 6, the system 100 may include memory dies 170A, 170B, 170C, and 170D, which may be associated with sub-channels 1 and 2, sub-channels 3 and 4, sub-channels 5 and 6, and sub-channels 7 and 8, respectively. Further, each such sub-channel may be associated with a respective plurality of memory banks 175, respective PIM blocks 185, and a respective sub-channel interface 202. In some examples, memory devices including a PIM block 185 may be configured according to a particular mode of operation (e.g., an efficiency mode of operation).

In an example of a single-rank configuration, the system 100 may include a single rank of memory dies, such as a first rank 602. The first rank 602 may include a first plurality of memory dies, such as memory dies 170A-D.

Further, FIG. 6 also illustrates that one or more sub-channel interfaces 202 may operate according to a particular mode of operation (e.g., an efficiency mode of operation). For example, the sub-channel interfaces 202A-2, 202B-1, 202C-2, and 202D-1 may be disabled while the sub-channel interfaces 202A-1, 202B-2, 202C-1, and 202D-2 remain active.

Figure 7:
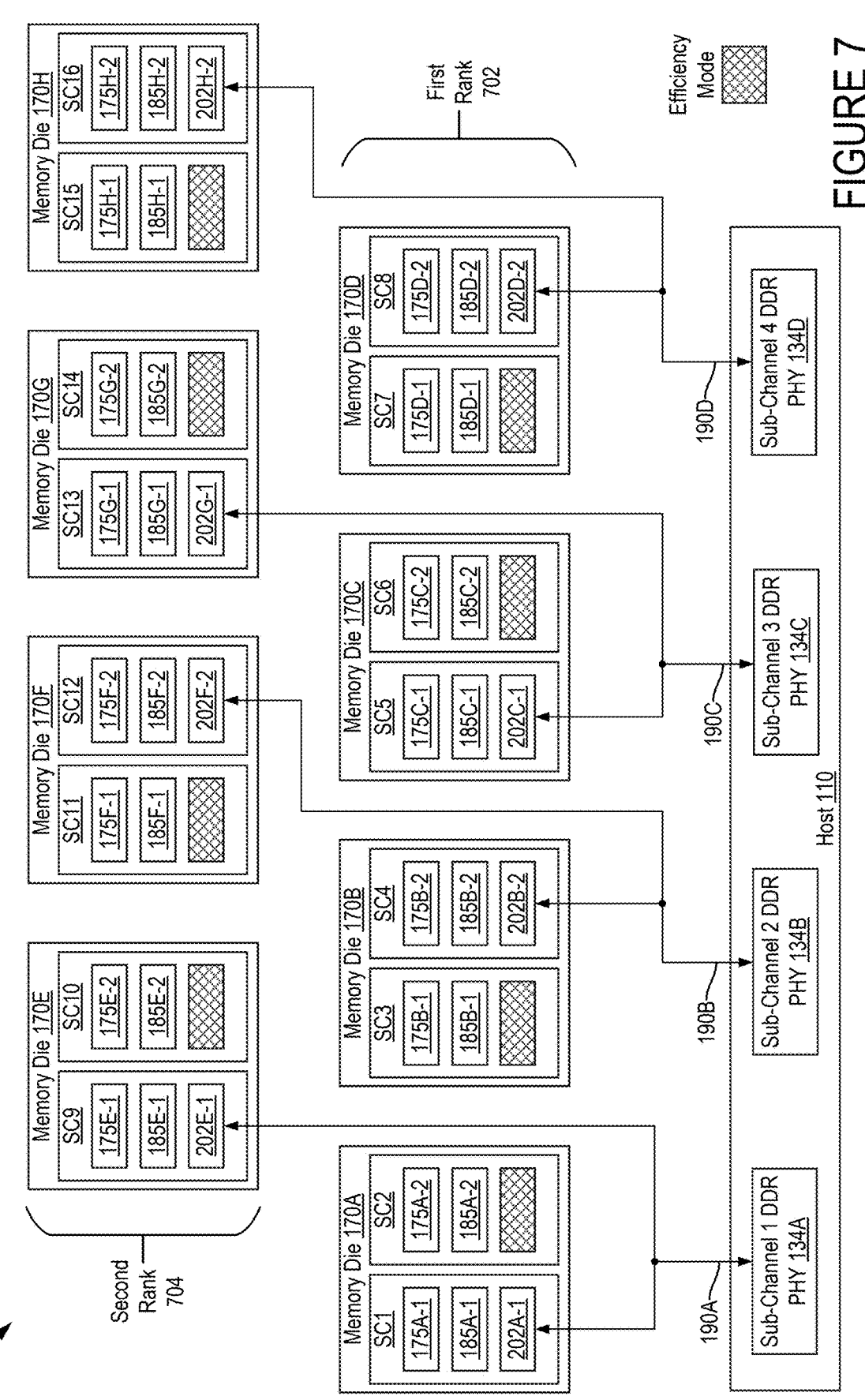
FIG. 7 illustrates an example of a multi-rank configuration that may be associated with the system of FIG. 1.

FIG. 7 illustrates an example of a multi-rank configuration that may be associated with the system 100. In the example of FIG. 7, the system 100 may include memory dies 170A, 170B, 170C, 170D, 170E, 170F, 170G, and 170H, which may be associated with sub-channels 1 and 2, sub-channels 3 and 4, sub-channels 5 and 6, and sub-channels 7 and 8, sub-channels 9 and 10, sub-channels 11 and 12, sub-channels 13 and 14, and sub-channels 15 and 16, respectively. Further, each such sub-channel may be associated with a respective plurality of memory banks 175, respective PIM blocks 185, and a respective sub-channel interface 202.

In an example of a multi-rank configuration, the system 100 may include a multiple ranks of memory dies, such as a first rank 702 of memory dies and a second rank 704 of memory dies. The first rank 702 may include a first plurality of memory dies, such as memory dies 170A-D. The second rank 704 may include a second plurality of memory dies, such as memory dies 170E-H.

In the example of FIG. 7, a sub-channel interface of a memory die of the first rank 702 may be coupled to another sub-channel interface of another memory die of the second rank 704. For example, the first sub-channel interface 202A-1 of the memory die 170A of the first rank 702 may be coupled to the sub-channel interface 202E-1 of the memory die 170E of the second rank 704.

In some examples of a multi-rank configuration, the system 100 may include a homogeneous set of memory dies. As referred to herein, a homogeneous set of memory dies may include memory dies having PIM blocks and may exclude any memory dies that do not include PIM blocks. For example, the first rank 702 may include memory dies 170A-D including PIM blocks 185A-D, and the second rank 704 may include memory dies 170E-H including PIM blocks 185E-H. In this case, the first rank 702 may be homogenous with respect to the second rank 704 of memory dies. In some other examples of a multi-rank configuration, the system 100 may include a heterogeneous set of memory dies, such as described further with reference to FIG. 8.

Figure 8:
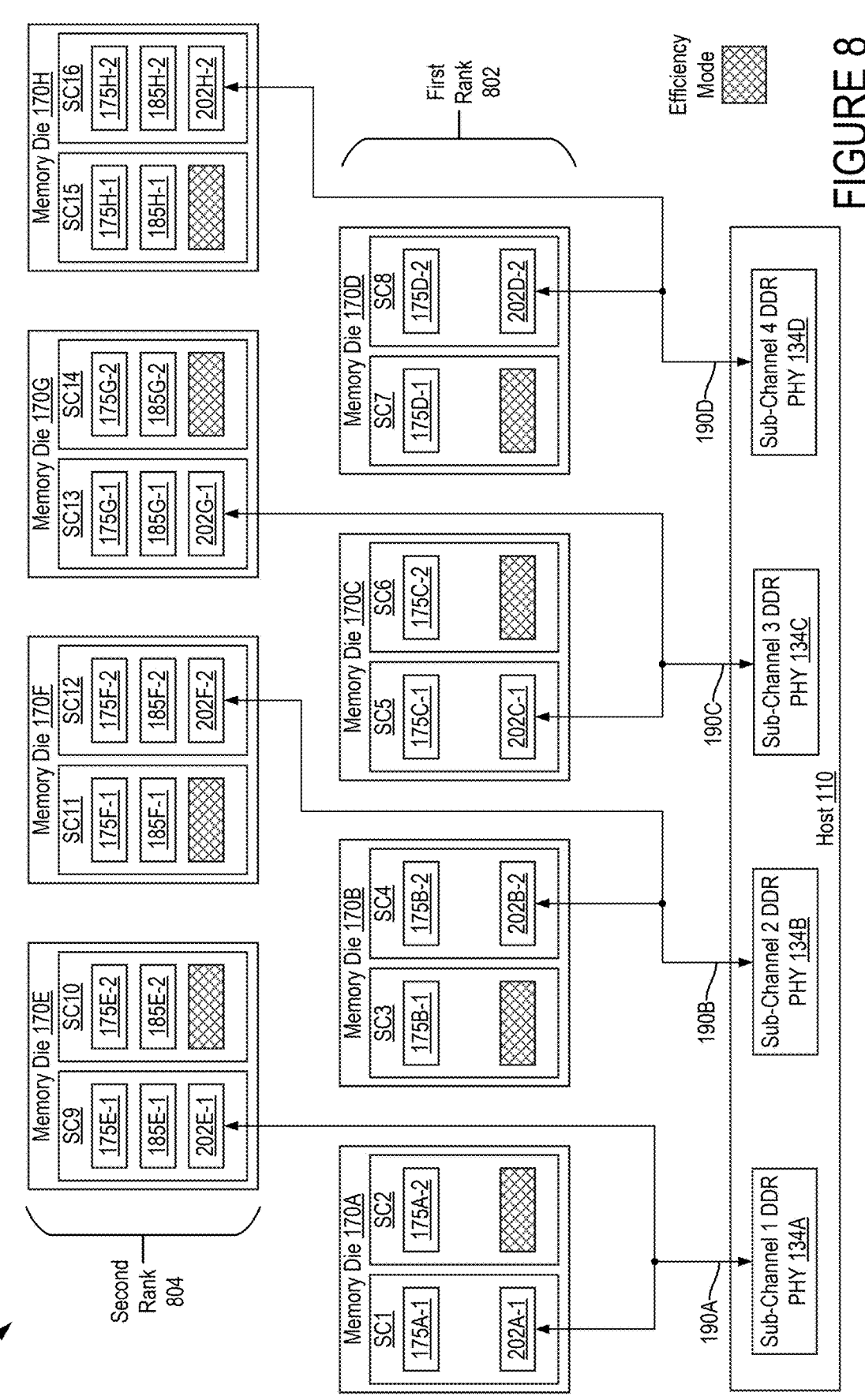
FIG. 8 illustrates an example of a multi-rank configuration that may be associated with the system of FIG. 1.

FIG. 8 illustrates an example of a multi-rank configuration that may be associated with the system 100. In the example of FIG. 8, the system 100 may include a heterogeneous set of memory dies. As referred to herein, a heterogeneous set of memory dies may include memory dies having PIM blocks and may further include memory dies without PIM blocks. For example, a first rank 802 may include memory dies 170A-D that do not include PIM blocks, and a second rank 804 may include memory dies 170E-H including PIM blocks 185E-H. In this case, the first rank 802 may be heterogeneous with respect to the second rank 804 of memory dies.

In some implementations, the system 100 may perform interleaving of operations on a per-rank basis. For example, operations may be interleaved across a rank of memory dies in accordance with the sub-channel interleaving scheme 400. Such interleaving may be performed separately for each rank. To further illustrate, in the example of FIG. 6, interleaving may be performed for memory dies of the rank 602. In the example of FIG. 7, interleaving may be performed for memory dies of the first rank 702 and separately for memory dies of the second rank 704. In the example of FIG. 8, interleaving may be performed for memory dies of the second rank 804.

In some examples, a rank that excludes PIM blocks may operate according to a different mode of operation as compared to a rank that includes PIM blocks. To illustrate, the first rank 802 may operate according to a performance mode, and the second rank 804 may operate according to an efficiency mode (not shown in FIG. 8). In some examples, the performance mode and the efficiency mode may correspond to the performance mode and the efficiency mode described with reference to FIG. 2, respectively.

In some implementations, a particular memory configuration may be selected to facilitate one or more features or benefits for a memory system. To illustrate, the particular memory configuration may be selected from a single-rank configuration (e.g., as illustrated in FIG. 6), a multi-rank homogeneous configuration (e.g., as illustrated in FIG. 7), or a multi-rank heterogeneous configuration (e.g., as illustrated in FIG. 8). In some examples, a single-rank configuration may facilitate lower cost (e.g., due to including fewer memory dies) as compared to another configuration, such as a multi-rank configuration. In some examples, a multi-rank homogeneous configuration may facilitate increased processing capability or increased throughput as compared to another configuration, such as a single-rank configuration or a multi-rank heterogeneous configuration. Further, in some examples, a multi-rank heterogeneous configuration may facilitate a trade-off between the other configurations. For example, a multi-rank heterogeneous configuration may achieve cost-reduction and reduced die size by excluding PIM blocks from a memory die while also facilitating increased processing capability or increased throughput by incorporating PIM blocks within another memory die.

FIG. 9 illustrates an example of storage partitioning for PIM-related data that may be associated with the system 100. As referred to herein, PIM-related data may include data that is processed by, or to be processed by, any of the PIM blocks 185. As an illustrative example, PIM-related data may include data that received from the host 110 and then processed by a PIM block 185 prior to being stored to a memory bank 175. As another illustrative example, PIM-related data may include data that is processed by a PIM block 185 after being read from a memory bank 175 prior to providing the data to the host 110. In some examples, the PIM-related data described with reference to FIG. 9 may include the PIM-related data 196 of FIG. 1, and the non-PIM-related data described with reference to FIG. 9 may include the non-PIM-related data 198 of FIG. 1.

In some examples, data may include a PIM flag indicating whether the data corresponds to PIM-related data. To illustrate, in some implementations, a PIM flag may be present in data if the data corresponds to PIM-related data. In some other examples, a PIM flag may be present in data if the data corresponds to non-PIM-related data. In some further examples, both PIM-related data and non-PIM-related data may include a PIM flag, and a value of the PIM flag may indicate whether data corresponds to PIM-related data or non-PIM-related data. For example, a logic one value (or a logic zero value) may indicate PIM-related data, and a logic zero value (or a logic one value) may indicate non-PIM-related data. In some implementations, the AI engine 124 of FIG. 2 may insert a PIM flag in data prior to sending the data to be stored to the memory die 170.

In the example of FIG. 9, a partitioning of physical address space of the memory die 170 for PIM-related data may include a first subset of memory banks of the memory die 170 and may exclude a second subset of memory banks of the memory die 170. For example, the first subset may include memory banks 4, 8, 12, and 16, and the second subset may include memory banks 1-3, 5-7, 9-11, and 13-15.

The example of FIG. 9 may achieve one or more benefits for a memory system. To illustrate, the example of FIG. 9 may be referred to as a bank-based partitioning for PIM-related data. Such a bank-based partitioning for PIM-related data may reduce or minimize duplicated bank page operations during sub-channel interleaving (e.g., sub-channel interleaving performed in accordance with the sub-channel interleaving scheme 400 of FIG. 4).

Figure 10:
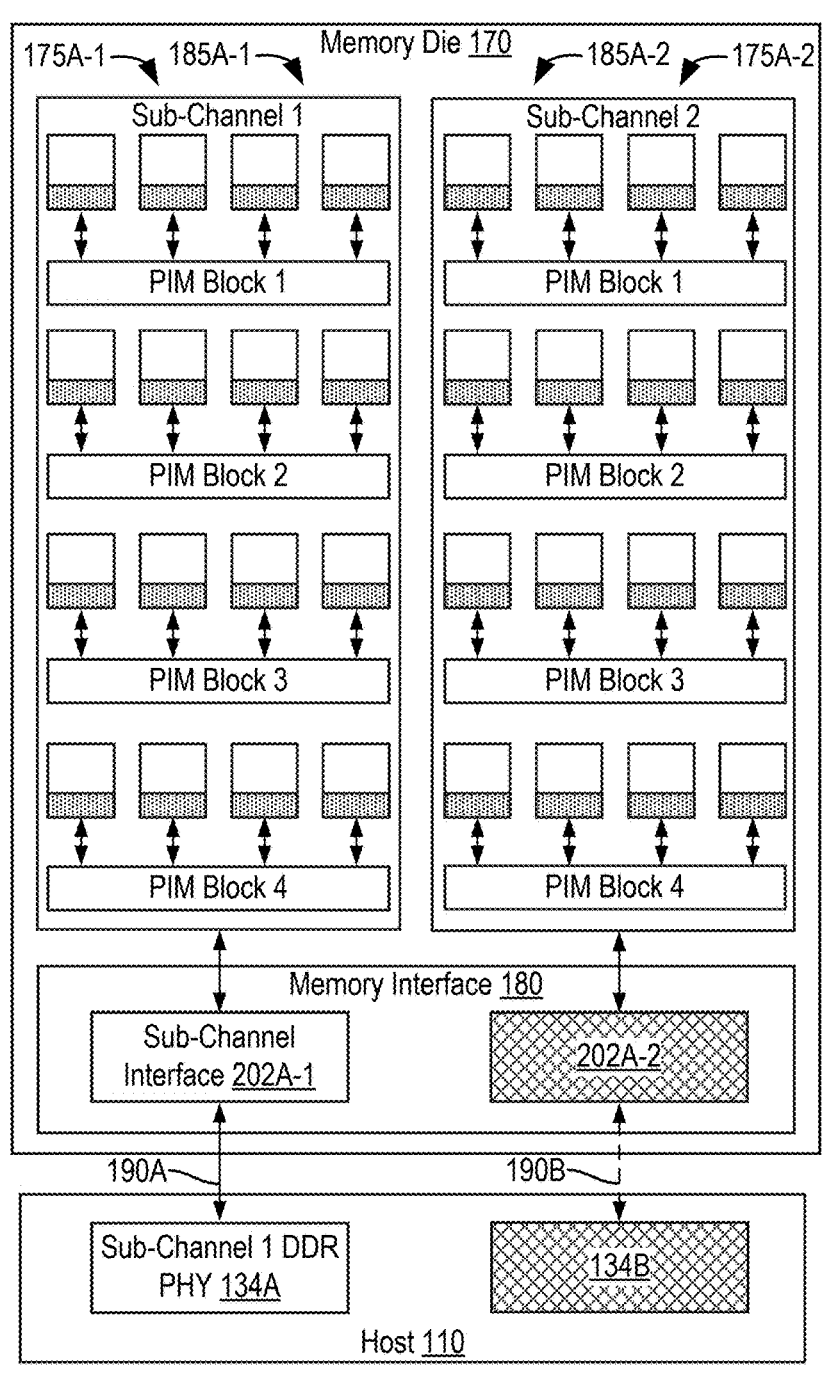
FIG. 10 illustrates another example of storage partitioning for PIM-related data that may be associated with the system of FIG. 1.

FIG. 10 illustrates another example of storage partitioning for PIM-related data that may be associated with the system 100. In the example of FIG. 9, a partitioning of the physical address space of the memory die 170 for PIM-related data may include, for at least one memory bank of the memory die 170, a first subset of rows of the memory bank and may exclude a second subset of the rows of the memory bank. In some examples, the PIM-related data described with reference to FIG. 10 may include the PIM-related data 196 of FIG. 1, and the non-PIM-related data described with reference to FIG. 10 may include the non-PIM-related data 198 of FIG. 1.

To further illustrate, the example of FIG. 9 may be referred to as a bank-based partitioning for PIM-related data, and the example of FIG. 10 may be referred to as a row-based partitioning for PIM-related data. Other examples are also within the scope of the disclosure. For example, in some implementations, a memory die 170 may include both bank-based partitioning of PIM-related data and row-based partitioning for PIM-related data. In some such examples, a memory die 170 may include at least a first bank reserved for PIM data (e.g., as illustrated in the example of FIG. 9) and may also include at least a second bank including one or more rows reserved for PIM-related data, where other rows of the second bank are associated with non-PIM-related data (e.g., as illustrated in the example of FIG. 10). In another example, one memory die 170 of the system 100 may include bank-based partitioning, and another memory die 170 of the system 100 may include row-based partitioning. Further, in some implementations, one or more memory dies 170 of the system 100 may not be subject to partitioning.

Although some examples herein may include memory access operations performed concurrently with PIM operations, other examples are also within the scope of the disclosure. To illustrate, in some examples, PIM-related performance may be accelerated by concurrently performing PIM operations associated with multiple different sub-channels. In some implementations, such PIM operations may be performed concurrently based on at least one of the sub-channels being associated with a particular state, such as an idle state.

To further illustrate, in some examples, the host 110 may detect that a usage level associated with the first plurality of memory banks 175A-1 fails to exceed a threshold. As referred to herein, a usage level of a plurality of memory banks may refer to, or may be associated with, an activity level of the plurality of memory banks. The usage level (or activity level) may include, for example, an access rate associated with the first plurality of memory banks 175A-1, an occupancy rate associated with the first plurality of memory banks 175A-1, a quantity of memory access commands scheduled to be sent to the first plurality of memory banks 175A-1, an amount of traffic associated with sub-channel 1 (SC1) of FIG. 3, one or more other parameters, or a combination thereof. As an illustrative example, the usage level associated with the first plurality of memory banks 175A-1 may fall below the threshold after (or prior to) performing the memory access operations illustrated in the example of the sub-channel interleaving scheme 400 of FIG. 4. During performance of such memory access operations, the usage level may meet or exceed the threshold.

In accordance with detecting that the usage level fails to exceed the threshold, the host 110 may initiate first PIM operations using the first plurality of PIM blocks 185A-1 concurrently with second PIM operations using the second plurality of PIM blocks 185A-2. The PIM blocks 185A-1 may perform the first PIM operations for one or more memory banks of the first plurality of memory banks 175A-1, and the PIM blocks 185A-2 may perform the second PIM operations for one or more memory banks of the second plurality of memory banks 175A-2 concurrently with the first PIM operations. As a result, performance may be accelerated by reducing or avoiding idleness of a sub-channel.

Figure 11:
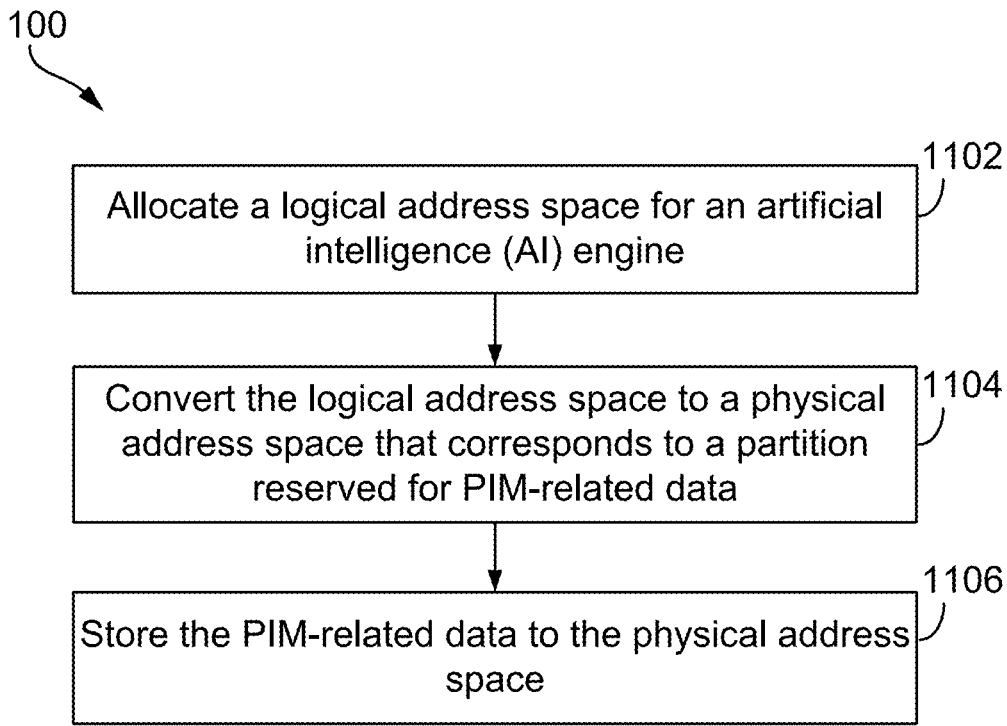
FIG. 11 is a flow chart of an example of a method of storage partitioning for PIM-related data.

FIG. 11 is a flow chart of an example of a method 1100 of storage partitioning for PIM-related data. In some examples, the method 1100 may be performed by the system 100, such as by the host 110. In some examples, the host 110 may include or correspond to a system-on-chip (SoC) that initiates, performs, or controls operations of the method 1100. In some examples, the host 110 may execute the AI engine 124 to initiate, perform, or control one or more operations of the method 1100.

The method 1100 may include allocating a logical address space for an artificial intelligence (AI) engine, at 1102. In some examples, a high level operating system (HLOS) kernel of the host 110 may allocate the logical address space for AI applications, such as a large language model (LLM). The AI applications may include the AI engine 124.

The method 1100 may further include converting the logical address space to a physical address space that corresponds to a partition reserved for PIM-related data, at 1104. For example, the host 110 may perform logical-to-physical (L2P) address translation of the logical address space to the physical address space. In some examples, the logical-to-physical (L2P) address translation may be performed in accordance with a memory addressing policy that specifies that PIM-related data is to be stored at a particular set of physical memory addresses corresponding to the physical address space. In some examples, the partition may correspond to a bank-based partition, such as the partition of FIG. 9. In some other examples, the partition may correspond to a row-based partition, such as the partition of FIG. 10. In some other examples, the partition may correspond to another partition.

The method 1100 may further include storing the PIM-related data to the physical address space, at 1106. For example, the host 110 may initiate a PIM store operation to store the PIM-related data to one or more memory banks 175 of one or more memory dies 170 of the system 100. The PIM-related data may include, for example, the PIM-related data 196 of FIG. 1, the PIM-related data described with reference to FIG. 9, the PM-related data described with reference to FIG. 10, other data, or a combination thereof.

One or more features described herein may improve performance of a system, such as the system 100. For example, by selectively performing PIM operations while a sub-channel interface 202 is deactivated, power consumption may be reduced (e.g., by power gating or clock gating the sub-channel interface 202) while increasing or maintaining throughput or other performance metrics (e.g., by "off-loading" processing to a memory die 170 via PIM blocks 185). Further, such benefits may be achieved while also facilitating access by the host 110 to contents of memory banks associated with the deactivated sub-channel interface 202. In some examples, interleaving PIM operations for a memory bank with memory access operations (e.g., a read operation or a write operation) for another memory bank may avoid performance degradation associated with some other memory architectures, such as memory architectures in which PIM operations may interfere with other memory traffic. As a result, power consumption may be reduced while increasing or maintaining throughput or other performance metrics, such as quality of service (QoS) performance metrics.

FIG. 12 is a flow chart of an example of a method 1200 of operation of a memory system. The memory system may include or may correspond to one or more memory dies, such as any of the memory dies 170. In some implementations, the memory system may include one or more ranks of memory dies, such as any of the ranks 602, 702, 704, 802, and 804.

The method 1200 includes, during a particular mode of operation associated with the memory system, communicating one or more memory access commands with a host device using a first sub-channel interface, at 1202. The one or more memory access commands are associated with a first plurality of memory banks of the memory system, and the first plurality of memory banks are associated with a first plurality of processor in memory (PIM) blocks. To illustrate, in an example, the memory die 170A may receive the memory access command 502 from the host 110 using the first sub-channel interface 202A-1. The memory access command 502 may be associated with the first plurality of memory banks 175A-1.

The method 1200 further includes, during the particular mode of operation, performing, concurrently with communication of the one or more memory access commands, one or more PIM operations using a second plurality of PIM blocks associated with a second plurality of memory banks of the memory die, at 1204. A memory interface of the memory system includes the first sub-channel interface and a second sub-channel interface, and the second sub-channel interface is disabled during the particular mode of operation. For example, the second plurality of PIM blocks 185A-2 may perform PIM operations concurrently with communication of the memory access command 502 via the first sub-channel interface 202A-1 while the second sub-channel interface 202A-2 is disabled.

The method 1200 further includes sending, during the particular mode of operation, results of the one or more PIM operations to the host device via the first sub-channel interface, at 1206. In some examples, the results may be included in the PIM-related data 198.

FIG. 13 is a flow chart of an example of a method of operation of a host device. In some examples, the host device may correspond to the host 110.

The method 1300 includes, during a particular mode of operation associated with a memory system, communicating one or more memory access commands with the memory system using a sub-channel PHY interface, at 1302. The one or more memory access commands are associated with a first plurality of memory banks of the memory system. The first plurality of memory banks are associated with a first plurality of processor in memory (PIM) blocks. To illustrate, in an example, the host 110 may send, to the memory die 170A via the PHY interface 134A, the memory access command 502 via the first sub-channel interface 202A-1. The memory access command 502 may be associated with the first plurality of memory banks 175A-1.

The method 1300 further includes receiving, during the particular mode of operation, results of one or more PIM operations via the sub-channel PHY interface, at 1304. The one or more PIM operations are performed concurrently with communication of the one or more memory access commands using a second plurality of PIM blocks associated with a second plurality of memory banks of the memory system. For example, the second plurality of PIM blocks 185A-2 may perform PIM operations concurrently with communication of the memory access command 502 via the first sub-channel interface 202A-1 while the second sub-channel interface 202A-2 is disabled. The host 110 may receive, via the PHY interface 134A, the results of the one or more PIM operations, such as by receiving the PIM-related data 196.

In a first aspect, a memory system includes a first plurality of memory banks, a first plurality of processor in memory (PIM) blocks associated with the first plurality of memory banks, a second plurality of memory banks, and a second plurality of PIM blocks associated with the second plurality of memory banks. The memory system further includes a memory interface including a first sub-channel interface associated with the first plurality of memory banks and the first plurality of PIM blocks and further including a second sub-channel interface associated with the second plurality of memory banks and the second plurality of PIM blocks. During a particular mode of operation, the first sub-channel interface is configured to communicate one or more memory access commands with a host device. The one or more memory access commands are associated with the first plurality of memory banks. During the particular mode of operation, the second plurality of PIM blocks are configured to perform, concurrently with communication of the one or more memory access commands, one or more PIM operations associated with the second plurality of memory banks. The second sub-channel interface is configured to be disabled during the particular mode of operation.

In a second aspect, in combination with the first aspect, the first plurality of PIM blocks is configured to perform, in accordance with a usage level associated with the first plurality of memory banks failing to exceed a threshold, first PIM operations concurrently with second PIM operations performed by the second plurality of PIM blocks.

In a third aspect, in combination with one or more of the first aspect or the second aspect, during a first cycle of a sub-channel interleaving scheme corresponding to the particular mode of operation, the first plurality of memory banks are configured to perform memory access operations associated with the one or more memory access commands and the second plurality of PIM blocks are configured to perform PIM operations for the second plurality of memory banks.

In a fourth aspect, in combination with one or more of the first aspect through the third aspect, during a second cycle of the sub-channel interleaving scheme, the second plurality of memory banks are configured to perform the memory access operations and the first plurality of PIM blocks are configured to perform the PIM operations for the first plurality of memory banks.

In a fifth aspect, in combination with one or more of the first aspect through the fourth aspect, during the first cycle of the sub-channel interleaving scheme, the first sub-channel interface is further configured to receive the one or more memory access commands from the host device during execution of PIM commands from the host device.

In a sixth aspect, in combination with one or more of the first aspect through the fifth aspect, the memory system further includes a first plurality of memory dies associated with a first rank, the first plurality of memory dies includes a first memory die and at least a second memory die, and the first memory die includes the first sub-channel interface, the first plurality of memory banks, the first plurality of PIM blocks, the second sub-channel interface, the second plurality of memory banks, and the second plurality of PIM blocks.

In a seventh aspect, in combination with one or more of the first aspect through the sixth aspect, the memory system further includes a second plurality of memory dies associated with a second rank.

In an eighth aspect, in combination with one or more of the first aspect through the seventh aspect, the first rank of memory dies is homogeneous with respect to the second rank of memory dies.

In a ninth aspect, in combination with one or more of the first aspect through the eighth aspect, the first rank of memory dies is heterogeneous with respect to the second rank of memory dies.

In a tenth aspect, in combination with one or more of the first aspect through the ninth aspect, at least the first plurality of memory banks includes a partition reserved for PIM-related data.

In an eleventh aspect, in combination with one or more of the first aspect through the tenth aspect, the partition reserved for the PIM-related data includes a first subset of the first plurality of memory banks and excludes a second subset of the first plurality of memory banks.

In a twelfth aspect, in combination with one or more of the first aspect through the eleventh aspect, the partition reserved for the PIM-related data includes, for each bank of the first plurality of memory banks, a first subset of rows of the memory bank and excludes a second subset of the rows of the memory bank.

In a thirteenth aspect, a method of operation of a memory system includes, during a particular mode of operation associated with the memory system, communicating one or more memory access commands with a host device using a first sub-channel interface. The one or more memory access commands are associated with a first plurality of memory banks of the memory system, and the first plurality of memory banks are associated with a first plurality of processor in memory (PIM) blocks. The method further includes, during the particular mode of operation, performing, concurrently with communication of the one or more memory access commands, one or more PIM operations using a second plurality of PIM blocks associated with a second plurality of memory banks of the memory system. A memory interface of the memory system includes the first sub-channel interface and a second sub-channel interface, and the second sub-channel interface is disabled during the particular mode of operation. The method further includes sending, during the particular mode of operation, results of the one or more PIM operations to the host device via the first sub-channel interface.

In a fourteenth aspect, in combination with the thirteenth aspect, the method further includes, in accordance with a usage level associated with the first plurality of memory banks failing to exceed a threshold, performing first PIM operations using the first plurality of PIM blocks concurrently with second PIM operations using the second plurality of PIM blocks.

In a fifteenth aspect, in combination with one or more of the thirteenth aspect through the fourteenth aspect, the method further includes, during a first cycle of a sub-channel interleaving scheme, performing, by the first plurality of memory banks, memory access operations associated with the one or more memory access commands and performing, by the second plurality of PIM blocks, PIM operations for the second plurality of memory banks.

In a sixteenth aspect, in combination with one or more of the thirteenth aspect through the fifteenth aspect, the method further includes, during a second cycle of the sub-channel interleaving scheme, performing, by the second plurality of memory banks, the memory access operations and performing, by the first plurality of PIM blocks, the PIM operations for the first plurality of memory banks.

In a seventeenth aspect, in combination with one or more of the thirteenth aspect through the sixteenth aspect, the method further includes, during the first cycle of the sub-channel interleaving scheme, receiving the one or more memory access commands via the first sub-channel interface from the host device and further includes, during the first cycle of the sub-channel interleaving scheme, executing PIM commands from the host device.

In an eighteenth aspect, in combination with one or more of the thirteenth aspect through the seventeenth aspect, the first sub-channel interface is included in a first memory die of a first plurality of memory dies associated with a first rank, the plurality of memory dies included in the memory system.

In a nineteenth aspect, in combination with one or more of the thirteenth aspect through the eighteenth aspect, the first sub-channel interface is coupled to another sub-channel interface of another memory die included in a second plurality of memory dies associated with a second rank.

In a twentieth aspect, in combination with one or more of the thirteenth aspect through the nineteenth aspect, the first rank of memory dies is homogeneous with respect to the second rank of memory dies.

In a twenty-first aspect, in combination with one or more of the thirteenth aspect through the twentieth aspect, the first rank of memory dies is heterogeneous with respect to the second rank of memory dies.

In a twenty-second aspect, in combination with one or more of the thirteenth aspect through the twenty-first aspect, at least the first plurality of memory banks includes a partition reserved for PIM-related data.

In a twenty-third aspect, in combination with one or more of the thirteenth aspect through the twenty-second aspect, the partition reserved for the PIM-related data includes a first subset of the first plurality of memory banks and excludes a second subset of the first plurality of memory banks.

In a twenty-fourth aspect, in combination with one or more of the thirteenth aspect through the twenty-third aspect, the partition reserved for the PIM-related data includes, for each bank of the first plurality of memory banks, a first subset of rows of the memory bank and excludes a second subset of the rows of the memory bank.

In a twenty-fifth aspect, an apparatus includes a processing system including one or more processors and one or more memories. The processing system is configured to communicate, during a particular mode of operation associated with a memory system, one or more memory access commands with the memory system using a sub-channel physical (PHY) interface. The one or more memory access commands are associated with a first plurality of memory banks of the memory system, and the first plurality of memory banks are associated with a first plurality of processor in memory (PIM) blocks. The processing system is further configured to receive, during the particular mode of operation, results of one or more PIM operations via the sub-channel PHY interface. The one or more PIM operations are performed concurrently with communication of the one or more memory access commands using a second plurality of PIM blocks associated with a second plurality of memory banks of the memory system.

In a twenty-sixth aspect, in combination with the twenty-fifth aspect, the processing system is further configured to detect that a usage level associated with the first plurality of memory banks fails to exceed a threshold and to initiate, in accordance with detecting that the usage level fails to exceed the threshold, first PIM operations using the first plurality of PIM blocks concurrently with second PIM operations using the second plurality of PIM blocks.

In a twenty-seventh aspect, in combination with one or more of the twenty-fifth aspect through the twenty-sixth aspect, the processing system is further configured to initiate, via the first sub-channel interface and during a first cycle of a sub-channel interleaving scheme, memory access operations associated with the one or more memory access commands at the first plurality of memory banks concurrently with performance of PIM operations by the second plurality of PIM blocks.

In a twenty-eighth aspect, in combination with one or more of the twenty-fifth aspect through the twenty-seventh aspect, the processing system is further configured to initiate, via the first sub-channel interface and during a second cycle of the sub-channel interleaving scheme, the memory access operations at the second plurality of memory banks concurrently with performance of the PIM operations by the first plurality of PIM blocks.

In a twenty-ninth aspect, in combination with one or more of the twenty-fifth aspect through the twenty-eighth aspect, the processing system is further configured to send, during the first cycle of the sub-channel interleaving scheme, the one or more memory access commands to the memory system during execution of PIM commands by the second plurality of PIM blocks.

In a thirtieth aspect, in combination with one or more of the twenty-fifth aspect through the twenty-ninth aspect, the processing system is further configured to allocate a logical address space for an artificial intelligence (AI) engine and to convert the logical address space to a physical address space that corresponds to a partition reserved for PIM-related data.

In a thirty-first aspect, in combination with one or more of the twenty-fifth aspect through the thirtieth aspect, the partition reserved for the PIM-related data includes a first subset of the first plurality of memory banks and excludes a second subset of the first plurality of memory banks.

In a thirty-second aspect, in combination with one or more of the twenty-fifth aspect through the thirty-first aspect, the partition reserved for the PIM-related data includes, for each bank of the first plurality of memory banks, a first subset of rows of the memory bank and excludes a second subset of the rows of the memory bank.

In a thirty-third aspect, a method of operation of a host device includes, during a particular mode of operation associated with a memory system, communicating one or more memory access commands with the memory system using a sub-channel (PHY) interface. The one or more memory access commands are associated with a first plurality of memory banks of the memory system, and the first plurality of memory banks are associated with a first plurality of processor in memory (PIM) blocks. The method further includes receiving, during the particular mode of operation, results of one or more PIM operations via the sub-channel PHY interface. The one or more PIM operations are performed concurrently with communication of the one or more memory access commands using a second plurality of PIM blocks associated with a second plurality of memory banks of the memory system.

In a thirty-fourth aspect, in combination with the thirty-third aspect, the method further includes detecting that a usage level associated with the first plurality of memory banks fails to exceed a threshold and further includes initiating, in accordance with detecting that the usage level fails to exceed the threshold, first PIM operations using the first plurality of PIM blocks concurrently with second PIM operations using the second plurality of PIM blocks.

In a thirty-fifth aspect, in combination with one or more of the thirty-third aspect through the thirty-fourth aspect, the method further includes initiating, via the first sub-channel interface and during a first cycle of a sub-channel interleaving scheme, memory access operations associated with the one or more memory access commands at the first plurality of memory banks concurrently with performance of PIM operations by the second plurality of PIM blocks.

In a thirty-sixth aspect, in combination with one or more of the thirty-third aspect through the thirty-fifth aspect, the method further includes initiating, via the first sub-channel interface and during a second cycle of the sub-channel interleaving scheme, the memory access operations at the second plurality of memory banks concurrently with performance of the PIM operations by the first plurality of PIM blocks.

In a thirty-seventh aspect, in combination with one or more of the thirty-third aspect through the thirty-sixth aspect, the method further includes sending, during the first cycle of the sub-channel interleaving scheme, the one or more memory access commands to the memory system during execution of PIM commands by the second plurality of PIM blocks.

In a thirty-eighth aspect, in combination with one or more of the thirty-third aspect through the thirty-seventh aspect, the method further includes allocating a logical address space for an artificial intelligence (AI) engine and converting the logical address space to a physical address space that corresponds to a partition reserved for PIM-related data.

In a thirty-ninth aspect, in combination with one or more of the thirty-third aspect through the thirty-eighth aspect, the partition reserved for the PIM-related data includes a first subset of the first plurality of memory banks and excludes a second subset of the first plurality of memory banks.

In a fortieth aspect, in combination with one or more of the thirty-third aspect through the thirty-ninth aspect, the partition reserved for the PIM-related data includes, for each bank of the first plurality of memory banks, a first subset of rows of the memory bank and excludes a second subset of the rows of the memory bank.

In a forty-first aspect, in combination with one or more of the first aspect through the fortieth aspect, the particular mode of operation corresponds to a static efficiency mode.

In a forty-second aspect, in combination with one or more of thirteenth aspect through the twenty-fourth aspect, a non-transitory computer-readable medium stores instructions that, when executed by one or more processors, cause the one or more processors to individually or collectively perform the method.

In a forty-third aspect, in combination with one or more of thirteenth aspect through the twenty-fourth aspect, an apparatus includes means for performing the method.

In a forty-fourth aspect, in combination with one or more of thirty-third aspect through the fortieth aspect, a non-transitory computer-readable medium stores instructions that, when executed by one or more processors, cause the one or more processors to individually or collectively perform the method.

In a forty-fifth aspect, in combination with one or more of thirty-third aspect through the fortieth aspect, an apparatus includes means for performing the method.

In a forty-sixth aspect, in combination with one or more of the first aspect through the thirteenth aspect, the memory system is configured to send, during the particular mode of operation, results of the one or more PIM operations to the host device via the first sub-channel interface.

In a forty-seventh aspect, in combination with one or more of the first aspect through the forty-sixth aspect, the usage level may correspond to, or may be associated with, an activity level of the first plurality of memory banks.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

As used herein, the term "determine" or "determining" encompasses a wide variety of actions and, therefore, "determining" can include calculating, computing, processing, deriving, estimating, investigating, looking up (such as via looking up in a table, a database, or another data structure), inferring, ascertaining, or measuring, among other possibilities. Also, "determining" can include receiving (such as receiving information), accessing (such as accessing data stored in memory) or transmitting (such as transmitting information), among other possibilities. Additionally, "determining" can include resolving, selecting, obtaining, choosing, establishing and other such similar actions.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the description and examples herein use the term "device" to describe various aspects of the disclosure, the term "device" is not limited to a specific configuration, type, or number of objects. As used herein, an apparatus may include a device or a portion of the device for performing the described operations.

Certain components in a device or apparatus described as "means for accessing," "means for receiving," "means for sending," "means for using," "means for selecting," "means for determining," "means for normalizing," "means for multiplying," or other similarly-named terms referring to one or more operations on data, such as image data, may refer to processing circuitry (such as application specific integrated circuits (ASICs), digital signal processors (DSP), graphics processing unit (GPU), central processing unit (CPU), computer vision processor (CVP), or neural signal processor (NSP)) configured to perform the recited function through hardware, software, or a combination of hardware configured by software.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to the Figures referenced above include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and processes described above. Whether such functionality is implemented in hardware or software depends upon the particular application and design constraints imposed on the overall system.

In one or more aspects, the operations described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

The operations of a method or algorithm disclosed herein may be implemented in a processor-executable software module which may reside on a computer-readable medium and commercially made available as a computer program product as software. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc wherein disks usually reproduce data magnetically and discs reproduce data optically with lasers. Combinations of the above should also be included within the scope of computer-readable media.

Various modifications to the implementations described in this disclosure may be readily apparent to those skilled in the art, and the generic principles defined herein may be applied to some other implementations without departing from the scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, opposing terms such as "upper" and "lower," or "front" and back," or "top" and "bottom," or "forward" and "backward," or "left" and "right" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown, or in sequential order, or that all illustrated operations be performed to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

As used herein, "based on" is intended to be interpreted in the inclusive sense, unless otherwise explicitly indicated. For example, "based on" may be used interchangeably with "based at least in part on," "associated with," "in association with," or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The term "substantially" is defined as largely, but not necessarily wholly, what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 5, 5, or 50 percent.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A memory system comprising:
a first plurality of memory banks;
a first plurality of processor in memory (PIM) blocks associated with the first plurality of memory banks;
a second plurality of memory banks;
a second plurality of PIM blocks associated with the second plurality of memory banks; and
a memory interface including a first sub-channel interface associated with the first plurality of memory banks and the first plurality of PIM blocks and further including a second sub-channel interface associated with the second plurality of memory banks and the second plurality of PIM blocks,
wherein, during a particular mode of operation associated with the memory system, the first sub-channel interface is configured to communicate one or more memory access commands with a host device, the one or more memory access commands associated with the first plurality of memory banks,
wherein, during the particular mode of operation, the second plurality of PIM blocks are configured to perform, concurrently with communication of the one or more memory access commands, one or more PIM operations associated with the second plurality of memory banks, and
wherein the second sub-channel interface is configured to be disabled during the particular mode of operation.

2. The memory system of claim 1, wherein the first plurality of PIM blocks is configured to perform, in accordance with a usage level associated with the first plurality of memory banks failing to exceed a threshold, first PIM operations concurrently with second PIM operations performed by the second plurality of PIM blocks.

3. The memory system of claim 1, wherein, during a first cycle of a sub-channel interleaving scheme corresponding to the particular mode of operation, the first plurality of memory banks are configured to perform memory access operations associated with the one or more memory access commands and the second plurality of PIM blocks are configured to perform PIM operations for the second plurality of memory banks.

4. The memory system of claim 3, wherein, during a second cycle of the sub-channel interleaving scheme, the second plurality of memory banks are configured to perform the memory access operations and the first plurality of PIM blocks are configured to perform the PIM operations for the first plurality of memory banks.

5. The memory system of claim 3, wherein, during the first cycle of the sub-channel interleaving scheme, the first sub-channel interface is further configured to receive the one or more memory access commands from the host device during execution of PIM commands from the host device.

6. The memory system of claim 1, further comprising a first plurality of memory dies associated with a first rank, wherein the first plurality of memory dies includes a first memory die and at least a second memory die, and wherein the first memory die includes the first sub-channel interface, the first plurality of memory banks, the first plurality of PIM blocks, the second sub-channel interface, the second plurality of memory banks, and the second plurality of PIM blocks.

7. The memory system of claim 6, further comprising a second plurality of memory dies associated with a second rank.

8. The memory system of claim 7, wherein the first rank of memory dies is homogeneous with respect to the second rank of memory dies.

9. The memory system of claim 7, wherein the first rank of memory dies is heterogeneous with respect to the second rank of memory dies.

10. The memory system of claim 1, wherein at least the first plurality of memory banks includes a partition reserved for PIM-related data.

11. The memory system of claim 10, wherein the partition reserved for the PIM-related data includes a first subset of the first plurality of memory banks and excludes a second subset of the first plurality of memory banks.

12. The memory system of claim 10, wherein the partition reserved for the PIM-related data includes, for each bank of the first plurality of memory banks, a first subset of rows of the memory bank and excludes a second subset of the rows of the memory bank.

13. A method of operation of a memory system, comprising:
during a particular mode of operation associated with the memory system, communicating one or more memory access commands with a host device using a first sub-channel interface, the one or more memory access commands associated with a first plurality of memory banks of the memory system, the first plurality of memory banks associated with a first plurality of processor in memory (PIM) blocks;

during the particular mode of operation, performing, concurrently with communication of the one or more memory access commands, one or more PIM operations using a second plurality of PIM blocks associated with a second plurality of memory banks of the memory system, wherein a memory interface of the memory system includes the first sub-channel interface and a second sub-channel interface, and wherein the second sub-channel interface is disabled during the particular mode of operation; and sending, during the particular mode of operation, results of the one or more PIM operations to the host device via the first sub-channel interface.

14. The method of claim 13, further comprising, in accordance with a usage level associated with the first plurality of memory banks failing to exceed a threshold, performing first PIM operations using the first plurality of PIM blocks concurrently with second PIM operations using the second plurality of PIM blocks.

15. The method of claim 13, further comprising:

during a first cycle of a sub-channel interleaving scheme:

performing, by the first plurality of memory banks, memory access operations associated with the one or more memory access commands; and performing, by the second plurality of PIM blocks, PIM operations for the second plurality of memory banks.

16. The method of claim 15, further comprising:

during a second cycle of the sub-channel interleaving scheme:

performing, by the second plurality of memory banks, the memory access operations; and performing, by the first plurality of PIM blocks, the PIM operations for the first plurality of memory banks.

17. The method of claim 15, further comprising:

during the first cycle of the sub-channel interleaving scheme, receiving the one or more memory access commands via the first sub-channel interface from the host device; and during the first cycle of the sub-channel interleaving scheme, executing PIM commands from the host device.

18. The method of claim 13, wherein the first sub-channel interface is included in a first memory die of a plurality of memory dies associated with a first rank, the plurality of memory dies included in the memory system.

19. The method of claim 18, wherein the first sub-channel interface is coupled to another sub-channel interface of another memory die included in a second plurality of memory dies associated with a second rank.

20. The method of claim 19, wherein the first rank of memory dies is homogeneous with respect to the second rank of memory dies.

21. The method of claim 19, wherein the first rank of memory dies is heterogeneous with respect to the second rank of memory dies.

22. The method of claim 13, wherein at least the first plurality of memory banks includes a partition reserved for PIM-related data.

23. The method of claim 22, wherein the partition reserved for the PIM-related data includes a first subset of the first plurality of memory banks and excludes a second subset of the first plurality of memory banks.

24. The method of claim 22, wherein the partition reserved for the PIM-related data includes, for each bank of the first plurality of memory banks, a first subset of rows of the memory bank and excludes a second subset of the rows of the memory bank.

25. An apparatus comprising:

a processing system including one or more processors and one or more memories, the processing system configured to:

during a particular mode of operation associated with a memory system, communicate one or more memory access commands with the memory system using a sub-channel physical (PHY) interface, the one or more memory access commands associated with a first plurality of memory banks of the memory system, the first plurality of memory banks associated with a first plurality of processor in memory (PIM) blocks; and receive, during the particular mode of operation, results of one or more PIM operations via the sub-channel PHY interface, the one or more PIM operations performed concurrently with communication of the one or more memory access commands using a second plurality of PIM blocks associated with a second plurality of memory banks of the memory system.

26. The apparatus of claim 25, wherein the processing system is further configured to:

detect that a usage level associated with the first plurality of memory banks fails to exceed a threshold; and in accordance with detecting that the usage level fails to exceed the threshold, initiate first PIM operations using the first plurality of PIM blocks concurrently with second PIM operations using the second plurality of PIM blocks.

27. The apparatus of claim 25, wherein the processing system is further configured to initiate, via the sub-channel PHY interface and during a first cycle of a sub-channel interleaving scheme, memory access operations associated with the one or more memory access commands at the first plurality of memory banks concurrently with performance of PIM operations by the second plurality of PIM blocks.

28. The apparatus of claim 27, wherein the processing system is further configured to initiate, via the sub-channel PHY interface and during a second cycle of the sub-channel interleaving scheme, the memory access operations at the second plurality of memory banks concurrently with performance of the PIM operations by the first plurality of PIM blocks.

29. The apparatus of claim 27, wherein the processing system is further configured to send, during the first cycle of the sub-channel interleaving scheme, the one or more memory access commands to the memory system during execution of PIM commands by the second plurality of PIM blocks.

30. The apparatus of claim 25, wherein the processing system is further configured to:

allocate a logical address space for an artificial intelligence (AI) engine; and convert the logical address space to a physical address space that corresponds to a partition reserved for PIM-related data.

31. The apparatus of claim 30, wherein the partition reserved for the PIM-related data includes a first subset of the first plurality of memory banks and excludes a second subset of the first plurality of memory banks.

32. The apparatus of claim 30, wherein the partition reserved for the PIM-related data includes, for each bank of the first plurality of memory banks, a first subset of rows of the memory bank and excludes a second subset of the rows of the memory bank.

33. A method of operation of a host device, comprising:

during a particular mode of operation associated with a memory system, communicating one or more memory access commands with the memory system using a sub-channel physical (PHY) interface, the one or more memory access commands associated with a first plurality of memory banks of the memory system, the first plurality of memory banks associated with a first plurality of processor in memory (PIM) blocks; and receiving, during the particular mode of operation, results of one or more PIM operations via the sub-channel PHY interface, the one or more PIM operations performed concurrently with communication of the one or more memory access commands using a second plurality of PIM blocks associated with a second plurality of memory banks of the memory system.

34. The method of claim 33, further comprising:

detecting that a usage level associated with the first plurality of memory banks fails to exceed a threshold; and in accordance with detecting that the usage level fails to exceed the threshold, initiating first PIM operations using the first plurality of PIM blocks concurrently with second PIM operations using the second plurality of PIM blocks.

35. The method of claim 33, further comprising initiating, via the sub-channel PHY interface and during a first cycle of a sub-channel interleaving scheme, memory access operations associated with the one or more memory access commands at the first plurality of memory banks concurrently with performance of PIM operations by the second plurality of PIM blocks.

36. The method of claim 35, further comprising initiating, via the sub-channel PHY interface and during a second cycle of the sub-channel interleaving scheme, the memory access operations at the second plurality of memory banks concurrently with performance of the PIM operations by the first plurality of PIM blocks.

37. The method of claim 35, further comprising sending, during the first cycle of the sub-channel interleaving scheme, the one or more memory access commands to the memory system during execution of PIM commands by the second plurality of PIM blocks.

38. The method of claim 33, further comprising:

allocating a logical address space for an artificial intelligence (AI) engine; and converting the logical address space to a physical address space that corresponds to a partition reserved for PIM-related data.

39. The method of claim 38, wherein the partition reserved for the PIM-related data includes a first subset of the first plurality of memory banks and excludes a second subset of the first plurality of memory banks.

40. The method of claim 38, wherein the partition reserved for the PIM-related data includes, for each bank of the first plurality of memory banks, a first subset of rows of the memory bank and excludes a second subset of the rows of the memory bank.

* * * * *